US012750198B2

(12) United States Patent
Liu et al.

(10) Patent No.: US 12,750,198 B2
(45) Date of Patent: Sep. 29, 2026

(54) CARRIER AGGREGATION METHOD, APPARATUS, AND SYSTEM

(71) Applicant: HUAWEI TECHNOLOGIES CO., LTD., Shenzhen (CN)

(72) Inventors: Yunfeng Liu, Shenzhen (CN); Zhiheng Guo, Beijing (CN); Xinqian Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

(21) Appl. No.: 18/504,960

(22) Filed: Nov. 8, 2023

(65) Prior Publication Data

US 2024/0072985 A1 Feb. 29, 2024

Related U.S. Application Data

(63) Continuation of application No. PCT/CN2022/091787, filed on May 9, 2022.

(30) Foreign Application Priority Data

May 11, 2021 (CN) ........................ 202110512392.X

(51) Int. Cl.
*H04W 24/08* (2009.01)
*H04L 5/00* (2006.01)

(52) U.S. Cl.
CPC .................................. *H04L 5/0098* (2013.01)

(58) Field of Classification Search
CPC ......... H04L 5/001; H04L 5/0098; H04L 5/14; H04W 72/0453; H04W 72/20; H04W 72/51
See application file for complete search history.

(56) References Cited

U.S. PATENT DOCUMENTS

2013/0155898 A1* 6/2013 Yin ........................ H04L 5/1469 370/254
2019/0159049 A1* 5/2019 Kim ...................... H04W 24/08
(Continued)

FOREIGN PATENT DOCUMENTS

| | | | |
|---|---|---|---|
| EP | 2761925 | B1 | 5/2018 |
| EP | 3506704 | A1 | 7/2019 |
| KR | 20200000283 | A | 1/2020 |

OTHER PUBLICATIONS

3rd Generation Partnership Project;Technical Specification Group Radio Access Network;NR;Medium Access Control (MAC) protocol specification(Release 16),3GPP TS 38.321 V16.4.0 (Mar. 2021),total:157pages.

(Continued)

*Primary Examiner* — Phuc H Tran
(74) *Attorney, Agent, or Firm* — HAUPTMAN HAM, LLP

(57) ABSTRACT

A terminal device receives first information from a network device, wherein the first information indicates a plurality of activated serving cells configured by the network device for the terminal device. The plurality of activated serving cells are located in at least two different frequency bands. The terminal device determines, among the plurality of activated serving cells, a reference cell in each of the at least two frequency bands corresponding to the plurality of activated serving cells. The terminal device determines a transmission direction of the terminal device in each of the plurality of activated serving cells. In the frequency band, transmission directions of the terminal device in the reference cell and another cell are the same, and the another cell is an activated serving cell other than the reference cell in the frequency band.

20 Claims, 6 Drawing Sheets

(56) References Cited

U.S. PATENT DOCUMENTS

| | | | | |
|---|---|---|---|---|
| 2021/0152299 | A1* | 5/2021 | Zhou | H04L 5/0023 |
| 2022/0030591 | A1* | 1/2022 | Takeda | H04W 72/0446 |
| 2022/0232655 | A1* | 7/2022 | Noh | H04W 76/16 |

OTHER PUBLICATIONS

3rd Generation Partnership Project;Technical Specification Group Radio Access Network;NR;Physical layer procedures for control(Release 15),3GPP TS 38.213 V15.13.0 (Mar. 2021),total:111pages.

3rd Generation Partnership Project;Technical Specification Group Radio Access Network;NR;Radio Resource Control (RRC) protocol specification(Release 16),total:949pages.

Extended European Search Report issued in corresponding European Application No. 22806700.5, dated Sep. 23, 2024, pp. 1-9.

Korean Office Action issued in corresponding Korean Application No. 18504960, dated Nov. 24, 2025, pp. 1-7.

* cited by examiner

CARRIER AGGREGATION METHOD, APPARATUS, AND SYSTEM

CROSS-REFERENCE TO RELATED APPLICATIONS

This application is a continuation of International Application No. PCT/CN2022/091787, filed on May 9, 2022, which claims priority to Chinese Patent Application No. 202110512392.X, filed on May 11, 2021. The disclosures of the aforementioned applications are hereby incorporated by reference in their entireties.

BACKGROUND

In a wireless communication system, an uplink/downlink peak rate of a terminal device is closely related to communication bandwidth accessible to the terminal device. Greater communication bandwidth accessible to the terminal device indicates a higher uplink/downlink peak rate of the terminal device. However, currently, in a single cell whose communication bandwidth is fixed, there is still a specific gap between a peak rate that is achieved by the terminal device and a usage of an enhanced mobile broadband (eMBB) scenario in a 5th generation (5G) mobile communication technology. To increase the peak rate of the terminal device and meet the parameters of the eMBB scenario, a design idea is that communication bandwidth of a plurality of cells is aggregated and then provided for the terminal device for use. This is also referred to as a carrier aggregation (CA) technology. In a carrier aggregation scenario, a concept of a carrier is equivalent to that of a cell. For example, accessing one carrier by the terminal device is equivalent to accessing one cell, and bandwidth of one carrier is communication bandwidth of one cell. After carriers (also referred to as component carriers (CCs)) of a plurality of cells are aggregated, bandwidth accessible to the terminal device is a sum of bandwidth of a plurality of carriers, and the peak rate of the terminal device is also able to be almost proportionally increased.

Currently, the CA technology is classified into intra-band contiguous carrier aggregation, intra-band non-contiguous carrier aggregation, and inter-band carrier aggregation based on frequency bands to which the aggregated CCs belong and whether the CCs are contiguous in frequency domain. As shown in FIG. 1*a*, in an inter-band carrier aggregation scenario, a CC 1 and a CC 2 respectively belong to different frequency bands: a frequency band A and a frequency band B. In a current standard, in the inter-band carrier aggregation scenario, the terminal device is to determine a transmission direction on each aggregated CC on one symbol. One CC represents one serving cell. The terminal device selects one reference cell from all activated serving cells located in different frequency bands, and a remaining cell is referred to as another cell. Further, the terminal device determines, according to a rule specified in the standard, transmission directions of the terminal device in the reference cell and the another cell on each symbol. Finally, on one symbol, the transmission directions of the terminal device in the reference cell and the another cell that are located in different frequency bands are the same.

However, the foregoing existing solution leads to a problem. In response to a capability of the terminal device supporting simultaneous transmission and reception on CCs located in different frequency bands, in other words, supports different transmission directions on CCs located in different frequency bands, the existing solution causes same transmission directions on CCs in different frequency bands. In other words, the terminal device cannot implement simultaneous transmission and reception on CCs in different frequency bands in the inter-band carrier aggregation scenario.

Therefore, how to enable the terminal device that supports simultaneous transmission and reception on CCs in different frequency bands to implement simultaneous transmission and reception on CCs in different frequency bands in the inter-band carrier aggregation scenario is an urgent problem to be resolved currently.

SUMMARY

Embodiments described herein provide a carrier aggregation method, an apparatus, and a system, to resolve a problem of how to enable a terminal device that supports simultaneous transmission and reception on CCs in different frequency bands to implement simultaneous transmission and reception on CCs in different frequency bands.

To achieve the foregoing objectives, the following technical solutions are used in at least one embodiment.

According to a first aspect, a carrier aggregation method is provided. A communication apparatus that performs the method is a terminal device, or is a module used in the terminal device, for example, a chip. The following uses an example in which an execution body is the terminal device for description. The terminal device receives first information from a network device, where the first information indicates a plurality of activated serving cells configured by the network device for the terminal device, and the plurality of activated serving cells are located in at least two different frequency bands. The terminal device determines, among the plurality of activated serving cells, a reference cell in each of the at least two frequency bands corresponding to the plurality of activated serving cells. The terminal device determines a transmission direction of the terminal device in each of the plurality of activated serving cells, where in the frequency band, transmission directions of the terminal device in the reference cell and another cell are the same, and the another cell is an activated serving cell other than the reference cell in the frequency band. According to the carrier aggregation method provided in at least one embodiment, the reference cell of the frequency band is determined in the frequency band, so that transmission directions on CCs in different frequency bands in inter-band CA are independently determined, to enable the terminal device that supports simultaneous transmission and reception on CCs in different frequency bands to implement simultaneous transmission and reception on CCs in different frequency bands in an inter-band CA scenario.

With reference to the first aspect, in at least one embodiment, the method further includes: The terminal device transmits second information to the network device, where the second information indicates that the terminal device supports simultaneous transmission and reception on carriers in different frequency bands. According to this solution, the network device determines, based on the second information, that the terminal device supports simultaneous transmission and reception on CCs in different frequency bands, so that the network device and the terminal device synchronously determine the transmission directions in the reference cell and the CC based on the carrier aggregation method provided in at least one embodiment.

With reference to the first aspect, in at least one embodiment, the method further includes: The terminal device receives third information from the network device, where the third information indicates a plurality of serving cells configured by the network device for the terminal device, and the plurality of serving cells include the plurality of activated serving cells. According to this solution, the terminal device learns of the serving cell configured by the network device for the terminal device.

With reference to the first aspect, in at least one embodiment, the third information includes serving cell indexes of the plurality of serving cells. According to this solution, the terminal device determines the configured serving cell based on the serving cell index.

With reference to the first aspect, in at least one embodiment, the first information includes a cell state of one or more of the plurality of serving cells, and the plurality of activated serving cells are serving cells having corresponding cell states among the plurality of serving cells. According to this solution, the terminal device determines, based on the cell state included in the first information, the serving cell having the cell state as the activated serving cell configured by the network device.

With reference to the first aspect, in at least one embodiment, the first information includes indication information of serving cell indexes of the plurality of activated serving cells. According to this solution, the terminal device determines the serving cell index based on the indication information that is of the serving cell index and that is included in the first information, and determine a serving cell corresponding to the serving cell index as the activated serving cell.

With reference to the first aspect, in at least one embodiment, the method further includes: The terminal device receives fourth information from the network device, where the fourth information includes a deactivation timer of one or more of the plurality of activated serving cells. The terminal device deactivates, based on the fourth information from the one or more of the plurality of activated serving cells, an activated serving cell in which no data is obtained through listening during running of the deactivation timer. According to this solution, the terminal device deactivates, based on the deactivation timer in the fourth information by itself, an activated serving cell that meets a condition.

With reference to the first aspect, in at least one embodiment, the method further includes: The terminal device receives fifth information from the network device, where the fifth information indicates a deactivated serving cell configured by the network device for the terminal device. The terminal device deactivates, among the plurality of activated serving cells, the deactivated serving cell indicated by the fifth information. According to this solution, the terminal device deactivates, based on the fifth information among the plurality of activated serving cells, the deactivated serving cell indicated by the fifth information.

With reference to the first aspect, in at least one embodiment, the fifth information includes indication information of a serving cell index of the deactivated serving cell. According to this solution, the terminal device determines, based on the fifth information, a serving cell corresponding to the serving cell index as the deactivated serving cell and deactivate the serving cell.

With reference to the first aspect, in at least one embodiment, that the terminal device determines, among the plurality of activated serving cells, a reference cell in each of the at least two frequency bands corresponding to the plurality of activated serving cells includes: The terminal device determines an activated serving cell having a smallest serving cell index in each of the at least two frequency bands corresponding to the plurality of activated serving cells as the reference cell in the frequency band. According to this solution, a manner of determining the reference cell in the frequency band is provided.

According to a second aspect, a carrier aggregation method is provided. A communication apparatus that performs the method is a network device, or is a module used in the network device, for example, a chip. The following uses an example in which an execution body is the network device for description. The network device transmits first information to a terminal device, where the first information indicates a plurality of activated serving cells configured by the network device for the terminal device, and the plurality of activated serving cells are located in at least two different frequency bands. The network device determines, among the plurality of activated serving cells, a reference cell in each of the at least two frequency bands corresponding to the plurality of activated serving cells. The network device determines a transmission direction of the network device in each of the plurality of activated serving cells, where in the frequency band, transmission directions of the network device in the reference cell and another cell are the same, and the another cell is an activated serving cell other than the reference cell in the frequency band. According to the carrier aggregation method provided in at least one embodiment, the reference cell of each frequency band is determined on each frequency band, so that transmission directions on CCs in different frequency bands in inter-band CA are independently determined, to implement simultaneous transmission and reception on CCs in different frequency bands in an inter-band CA scenario.

With reference to the second aspect, in at least one embodiment, the method further includes: The network device receives second information from the terminal device, where the second information indicates that the terminal device supports simultaneous transmission and reception on carriers in different frequency bands. According to this solution, the network device determines, based on the second information, that the terminal device supports simultaneous transmission and reception on CCs in different frequency bands, so that the network device and the terminal device synchronously determine the transmission directions in the reference cell and the CC based on the carrier aggregation method provided in at least one embodiment.

With reference to the second aspect, in at least one embodiment, the method further includes: The network device transmits third information to the terminal device, where the third information indicates a plurality of serving cells configured by the network device for the terminal device, and the plurality of serving cells include the plurality of activated serving cells. According to this solution, the terminal device learns of the serving cell configured by the network device for the terminal device.

With reference to the second aspect, in at least one embodiment, the third information includes serving cell indexes of the plurality of serving cells. According to this solution, the terminal device determines the configured serving cell based on the serving cell index.

With reference to the second aspect, in at least one embodiment, the first information includes a cell state of one or more of the plurality of serving cells, and the plurality of activated serving cells are serving cells having corresponding cell states among the plurality of serving cells. According to this solution, the network device indicates, to the terminal device by using the cell state included in the first information, the configured activated serving cell.

With reference to the second aspect, in at least one embodiment, the first information includes indication information of serving cell indexes of the plurality of activated serving cells. According to this solution, the network device indicates, to the terminal device by using the serving cell index included in the first information, the configured activated serving cell.

With reference to the second aspect, in at least one embodiment, the method further includes: The network device transmits fourth information to the terminal device, where the fourth information includes a deactivation timer of one or more of the plurality of activated serving cells. According to this solution, the terminal device deactivates, based on the deactivation timer in the fourth information by itself, an activated serving cell that meets a condition.

With reference to the second aspect, in at least one embodiment, the method further includes: The network device transmits fifth information to the terminal device, where the fifth information indicates a deactivated serving cell configured by the network device for the terminal device. According to this solution, the terminal device deactivates, based on the received fifth information among the plurality of activated serving cells, the deactivated serving cell indicated by the fifth information.

With reference to the second aspect, in at least one embodiment, the fifth information includes indication information of a serving cell index of the deactivated serving cell. According to this solution, the terminal device determines the serving cell index of the deactivated serving cell based on the fifth information, and deactivate an activated serving cell corresponding to the serving cell index.

With reference to the second aspect, in at least one embodiment, that the network device determines, among the plurality of activated serving cells, a reference cell in each of the at least two frequency bands corresponding to the plurality of activated serving cells includes: The network device determines an activated serving cell having a smallest serving cell index in each of the at least two frequency bands corresponding to the plurality of activated serving cells as the reference cell in the frequency band. According to this solution, a manner of determining the reference cell in the frequency band is provided.

According to a third aspect, a communication apparatus is provided to implement the foregoing method. The communication apparatus includes a corresponding module, unit, or means for implementing the foregoing method. The module, unit, or means is implemented by hardware, is implemented by software, or is implemented by hardware executing corresponding software. The hardware or the software includes one or more modules or units corresponding to the foregoing functions.

With reference to the third aspect, in at least one embodiment, the communication apparatus includes a transceiver module and a processing module. The transceiver module is configured to receive first information from a network device, where the first information indicates a plurality of activated serving cells configured by the network device for a terminal device, and the plurality of activated serving cells are located in at least two different frequency bands. The processing module is configured to determine, among the plurality of activated serving cells, a reference cell in each of the at least two frequency bands corresponding to the plurality of activated serving cells. The processing module is further configured to determine a transmission direction of the terminal device in each of the plurality of activated serving cells, where in the frequency band, transmission directions of the terminal device in the reference cell and another cell are the same, and the another cell is an activated serving cell other than the reference cell in the frequency band.

With reference to the third aspect, in at least one embodiment, the transceiver module is further configured to transmit second information to the network device, where the second information indicates that the terminal device supports simultaneous transmission and reception on carriers in different frequency bands.

With reference to the third aspect, in at least one embodiment, the transceiver module is further configured to receive third information from the network device, where the third information indicates a plurality of serving cells configured by the network device for the terminal device, and the plurality of serving cells include the plurality of activated serving cells.

With reference to the third aspect, in at least one embodiment, the third information includes serving cell indexes of the plurality of serving cells.

With reference to the third aspect, in at least one embodiment, the first information includes a cell state of one or more of the plurality of serving cells, and the plurality of activated serving cells are serving cells having corresponding cell states among the plurality of serving cells.

With reference to the third aspect, in at least one embodiment, the first information includes indication information of serving cell indexes of the plurality of activated serving cells.

With reference to the third aspect, in at least one embodiment, the transceiver module is further configured to receive fourth information from the network device, where the fourth information includes a deactivation timer of one or more of the plurality of activated serving cells. The processing module is further configured to deactivate, based on the fourth information from the one or more of the plurality of activated serving cells, an activated serving cell in which no data is obtained through listening during running of the deactivation timer.

With reference to the third aspect, in at least one embodiment, the transceiver module is further configured to receive fifth information from the network device, where the fifth information indicates a deactivated serving cell configured by the network device for the terminal device. The processing module is further configured to deactivate, among the plurality of activated serving cells, the deactivated serving cell indicated by the fifth information.

With reference to the third aspect, in at least one embodiment, the fifth information includes indication information of a serving cell index of the deactivated serving cell.

With reference to the third aspect, in at least one embodiment, to determine, among the plurality of activated serving cells, a reference cell in each of the at least two frequency bands corresponding to the plurality of activated serving cells, the processing module is further configured to: determine an activated serving cell having a smallest serving cell index in each of the at least two frequency bands corresponding to the plurality of activated serving cells as the reference cell in the frequency band.

For technical effects brought by at least one embodiment in the third aspect, refer to technical effects brought by different designs in the first aspect. Details are not described herein again.

According to a fourth aspect, a communication apparatus is provided to implement the foregoing method. The communication apparatus includes a corresponding module, unit, or means for implementing the foregoing method. The module, unit, or means is implemented by hardware, is implemented by software, or is implemented by hardware executing corresponding software. The hardware or the software includes one or more modules or units corresponding to the foregoing functions.

With reference to the fourth aspect, in at least one embodiment, the communication apparatus includes a transceiver module and a processing module. The transceiver module is configured to transmit first information to a terminal device, where the first information indicates a plurality of activated serving cells configured by a network device for the terminal device, and the plurality of activated serving cells are located in at least two different frequency bands. The processing module is configured to determine, among the plurality of activated serving cells, a reference cell in each of the at least two frequency bands corresponding to the plurality of activated serving cells. The processing module is further configured to determine a transmission direction of the network device in each of the plurality of activated serving cells, where in the frequency band, transmission directions of the network device in the reference cell and another cell are the same, and the another cell is an activated serving cell other than the reference cell in the frequency band.

With reference to the fourth aspect, in at least one embodiment, the transceiver module is further configured to receive second information from the terminal device, where the second information indicates that the terminal device supports simultaneous transmission and reception on carriers in different frequency bands.

With reference to the fourth aspect, in at least one embodiment, the transceiver module is further configured to transmit third information to the terminal device, where the third information indicates a plurality of serving cells configured by the network device for the terminal device, and the plurality of serving cells include the plurality of activated serving cells.

With reference to the fourth aspect, in at least one embodiment, the third information includes serving cell indexes of the plurality of serving cells.

With reference to the fourth aspect, in at least one embodiment, the first information includes a cell state of one or more of the plurality of serving cells, and the plurality of activated serving cells are serving cells having corresponding cell states among the plurality of serving cells.

With reference to the fourth aspect, in at least one embodiment, the first information includes indication information of serving cell indexes of the plurality of activated serving cells.

With reference to the fourth aspect, in at least one embodiment, the transceiver module is further configured to transmit fourth information to the terminal device, where the fourth information includes a deactivation timer of one or more of the plurality of activated serving cells.

With reference to the fourth aspect, in at least one embodiment, the transceiver module is further configured to transmit fifth information to the terminal device, where the fifth information indicates a deactivated serving cell configured by the network device for the terminal device.

With reference to the fourth aspect, in at least one embodiment, the fifth information includes indication information of a serving cell index of the deactivated serving cell.

With reference to the fourth aspect, in at least one embodiment, to determine, among the plurality of activated serving cells, a reference cell in each of the at least two frequency bands corresponding to the plurality of activated serving cells, the processing module is further configured to: being configured to determine an activated serving cell having a smallest serving cell index in each of the at least two frequency bands corresponding to the plurality of activated serving cells as the reference cell in the frequency band.

For technical effects brought by at least one embodiment in the fourth aspect, refer to technical effects brought by different designs in the second aspect. Details are not described herein again.

According to a fifth aspect, a communication apparatus is provided, and includes a processor and a memory. The memory is configured to store computer-executable instructions. In response to the communication apparatus running, the processor executes the computer-executable instructions stored in the memory, to enable the communication apparatus to perform the carrier aggregation method according at least one embodiment of the first aspect.

According to a sixth aspect, a communication apparatus is provided, and includes a processor and a memory. The memory is configured to store computer-executable instructions. In response to the communication apparatus running, the processor executes the computer-executable instructions stored in the memory, to enable the communication apparatus to perform the carrier aggregation method according at least one embodiment of the second aspect.

According to a seventh aspect, a communication apparatus is provided, and includes a processor. The processor is configured to: be coupled to a memory and perform the carrier aggregation method according at least one embodiment of the first aspect according to instructions after reading the instructions in the memory.

According to an eighth aspect, a communication apparatus is provided, and includes a processor. The processor is configured to: be coupled to a memory and perform the carrier aggregation method according at least one embodiment of the second aspect according to instructions after reading the instructions in the memory.

According to a ninth aspect, a computer-readable storage medium is provided. The computer-readable storage medium stores instructions. In response to the instructions being run on a computer, the computer is enabled to perform the carrier aggregation method according at least one embodiment of the first aspect.

According to a tenth aspect, a computer-readable storage medium is provided. The computer-readable storage medium stores instructions. In response to the instructions being run on a computer, the computer is enabled to perform the carrier aggregation method according at least one embodiment of the second aspect.

According to an eleventh aspect, a computer program product including instructions is provided. In response to the instructions being run on a computer, the computer is enabled to perform the carrier aggregation method according at least one embodiment of the first aspect.

According to a twelfth aspect, a computer program product including instructions is provided. In response to the instructions being run on a computer, the computer is enabled to perform the carrier aggregation method according at least one embodiment of the second aspect.

According to a thirteenth aspect, an apparatus (where for example, the apparatus is a chip system) is provided. The apparatus includes a processor, configured to support the communication apparatus in implementing a function in the first aspect. In at least one embodiment, the apparatus further includes a memory. The memory is configured to store program instructions and data of the communication apparatus. In response to the apparatus being the chip system, the apparatus includes a chip, or includes a chip and another discrete device.

According to a fourteenth aspect, an apparatus (where for example, the apparatus is a chip system) is provided. The apparatus includes a processor, configured to support the communication apparatus in implementing a function in the second aspect. In at least one embodiment, the apparatus further includes a memory. The memory is configured to store program instructions and data of the communication apparatus. In response to the apparatus being the chip system, the apparatus includes a chip, or includes a chip and another discrete device.

According to a fifteenth aspect, a communication system is provided. The communication system includes a terminal device and a network device. The network device is configured to transmit first information to the terminal device, where the first information indicates a plurality of activated serving cells configured by the network device for the terminal device, and the plurality of activated serving cells are located in at least two different frequency bands. The terminal device is configured to receive the first information from the network device. The terminal device is further configured to determine a reference cell in each of the at least two frequency bands corresponding to the plurality of activated serving cells. The terminal device is further configured to determine a transmission direction of the terminal device in each of the plurality of activated serving cells, where in the frequency band, transmission directions of the terminal device in the reference cell and another cell are the same, and the another cell is an activated serving cell other than the reference cell in the frequency band. Specifically, for a specific implementation of the terminal device, refer to any one of the first aspect. Details are not described herein again. For a specific implementation of the network device, refer to any one of the second aspect. Details are not described herein again.

DESCRIPTION OF EMBODIMENTS

Before embodiments herein are described in detail, to facilitate understanding of technical solutions in at least one embodiment, related technical terms in at least one embodiment are first briefly described as follows:

1. Carrier Aggregation

The carrier aggregation is to aggregate two or more carrier units (also referred to as component carriers) to support higher transmission bandwidth. Each carrier unit corresponds to one independent cell, and one carrier unit is usually equivalent to one cell. In a CA scenario, a terminal device performs data communication (for example, data receiving or data transmitting), through a plurality of aggregated cells (in other words, CCs), with a network device to which the cells belong, so that a throughput of the terminal device is improved.

Figure 1A:
FIG. 1a Prior Art
FIG. 1*a* is a schematic diagram of inter-band CA according to at least one embodiment.
Figure 1B:
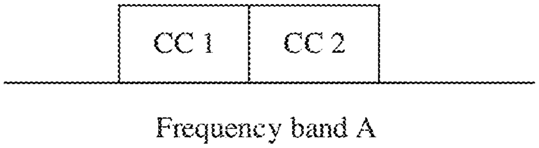
FIG. 1B is a schematic diagram of intra-band contiguous CA according to at least one embodiment.
Figure 1C:
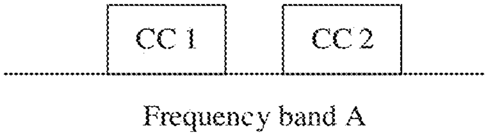
FIG. 1*c* is a schematic diagram of intra-band non-contiguous CA according to at least one embodiment.

Currently, the CA technology is classified into intra-band contiguous carrier aggregation, intra-band non-contiguous carrier aggregation, and inter-band carrier aggregation based on frequency bands to which the aggregated CCs belong and whether the CCs are contiguous in frequency domain. As shown in FIG. 1*a*, in inter-band CA, a CC 1 and a CC 2 respectively belong to different frequency bands: a frequency band A and a frequency band B. As shown in FIG. 1B, in intra-band contiguous CA, the CC 1 and the CC 2 belong to a same frequency band: the frequency band A, and are contiguous in frequency domain. As shown in FIG. 1*c*, in intra-band non-contiguous CA, the CC 1 and the CC 2 belong to the same frequency band: the frequency band A, but are not contiguous in frequency domain. In inter-band CA, in response to there being two or more CCs in one frequency band, whether a plurality of CCs in the frequency band are contiguous or not contiguous in frequency domain is not limited.

In a current standard, in the CA scenario, transmission directions on different CCs on one symbol are different, and the terminal device determines, on the symbol, a transmission direction on each aggregated CC. Determining the transmission direction on the CC on the symbol is to determine whether the CC is uplink (UL) or downlink (DL) on the symbol.

As described above, one CC represents one serving cell. In a conventional technology, in response to a plurality of serving cells of CA being located in a same frequency band/different frequency bands, the terminal device selects one reference cell from all activated serving cells, and a remaining cell is referred to as another cell. The terminal device determines, according to a rule specified in the standard, transmission directions in the reference cell and the another cell on each symbol. According to the existing standard, finally, on one symbol, transmission directions of the terminal device in the reference cell and the another cell (including activated serving cells located in different frequency bands or the same frequency band) are the same.

In response to the transmission directions in the reference cell and the another cell on each symbol being determined according to the rule specified in the standard, finally, there is no transmission direction in some activated serving cells. Therefore, that the transmission directions of the reference cell and the another cell are the same includes the following cases:

1. The transmission directions on all CCs are uplink.
2. The transmission directions on all CCs are downlink
3. The transmission directions on some CCs are uplink, and there is no transmission direction on a remaining CC.
4. The transmission directions on some CCs are downlink, and there is no transmission direction on the remaining CC.

The following uses interaction between the terminal device and the network device as an example to describe a relationship between a transmission direction and simultaneous transmission and reception on a CC. For the terminal device, on the CC, the terminal device transmits an uplink signal to the network device and receives a downlink signal from the network device. For the network device, on the CC, the network device receives the uplink signal from the terminal device and transmits the downlink signal to the terminal device. Therefore, on one symbol, for the terminal device, in response to the transmission direction on the CC is uplink, the uplink is referred to as transmission on the CC, and for the network device, is referred to as reception on the CC. For the terminal device, in response to the transmission direction on the CC is downlink, the downlink is referred to as reception on the CC, and for the network device, is referred to as transmission on the CC. For the terminal device and the network device, in response to there is no transmission direction on the CC, this case is referred to as that neither transmission nor reception is performed. Therefore, on one symbol, in response to the transmission directions of the terminal device on different CCs being different, the terminal device implements simultaneous transmission and reception on the different CCs. In response to the transmission directions of the terminal device on the different CCs being the same, the terminal device cannot implement simultaneous transmission and reception on the different CCs.

Figure 2:
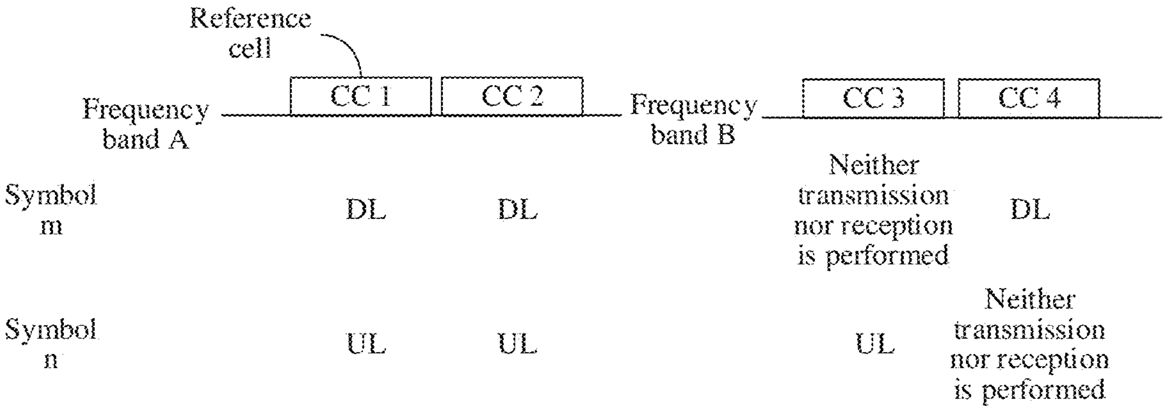
FIG. 2 is a schematic diagram of determining a transmission direction on a CC in an existing solution.

The existing solution is described by using a specific example. As shown in FIG. 2, a CC 1, a CC 2, a CC 3, and a CC 4 represent activated serving cells of the terminal device, where the CC 1 is selected as a reference cell. On one symbol m, downlink transmission is performed in the reference cell CC 1 and another cell: the CC 2 and the CC 4, where transmission directions are the same, and no transmission is performed in the another cell CC 3, that is, neither transmission nor reception is performed. On a symbol n, uplink transmission is performed in the reference cell CC 1 and the another cell: the CC 2 and the CC 3, where transmission directions are the same, and no transmission is performed in the another cell CC 4, that is, neither transmission nor reception is performed. Therefore, according to the existing solution, finally, transmission directions on all CCs (including CCs located in different frequency bands or the same frequency band) are the same, and the terminal device cannot implement simultaneous transmission and reception.

In conclusion, in the existing solution, in the inter-band carrier aggregation scenario, the terminal device cannot implement simultaneous transmission and reception on CCs in different frequency bands. However, a capability (for example, a CA capability) of some terminal devices supports simultaneous transmission and reception on CCs located in different frequency bands. Therefore, how to enable the terminal device that supports simultaneous transmission and reception on CCs in different frequency bands to implement simultaneous transmission and reception on CCs in different frequency bands in the inter-band carrier aggregation scenario is an urgent problem to be resolved currently.

The following describes the technical solutions in at least one embodiment with reference to accompanying drawings in at least one embodiment. In the descriptions of at least one embodiment, unless otherwise specified, "I" indicates an "or" relationship between associated objects. For example, A/B represents A or B. In at least one embodiment, "and/or" describes only an association relationship for describing the associated objects and represents that three relationships exist. For example, A and/or B represent the following three cases: Only A exists, both A and B exist, and only B exists, where A and B is singular or plural. In addition, in the descriptions of at least one embodiment, unless otherwise specified, "a plurality or means two or more. "At least one of" the following items (pieces)" or a similar expression thereof indicates any combination of these items, including a single item (piece) or any combination of a plurality of items (pieces). For example, "at least one item (piece) of a, b, and c" or "at least one item (piece) of a, b, or c" indicate: a, b, c, a and b, a and c, b and c, or a, b, and c, where a, b, and c is one or more. In addition, to clearly describe the technical solutions in at least one embodiment, the terms such as "first" and "second" are used in at least one embodiment to distinguish between same items or similar items that have basically the same functions or purposes. A person skilled in the art understands that the terms such as "first" and "second" do not limit a quantity or an execution sequence, and the terms such as "first" and "second" do not indicate a definite difference. In addition, in at least one embodiment, the word such as "example" or "for example" is used to represent giving an example, an illustration, or a description. Any embodiment or design scheme described as an "example" or "for example" in at least one embodiment should not be explained as being more preferred or having more advantages than another embodiment or design scheme. Exactly, use of the word such as "example" or "for example" is intended to present a related concept in a specific manner for ease of understanding.

In addition, a network architecture and a service scenario described in at least one embodiment are intended to describe the technical solutions in at least one embodiment more clearly, and do not constitute any limitation on the technical solutions provided in at least one embodiment. A person of ordinary skill in the art knows that with evolution of the network architecture and emergence of a new service scenario, the technical solutions provided in at least one embodiment are also applicable to similar technical problems.

Figure 3:
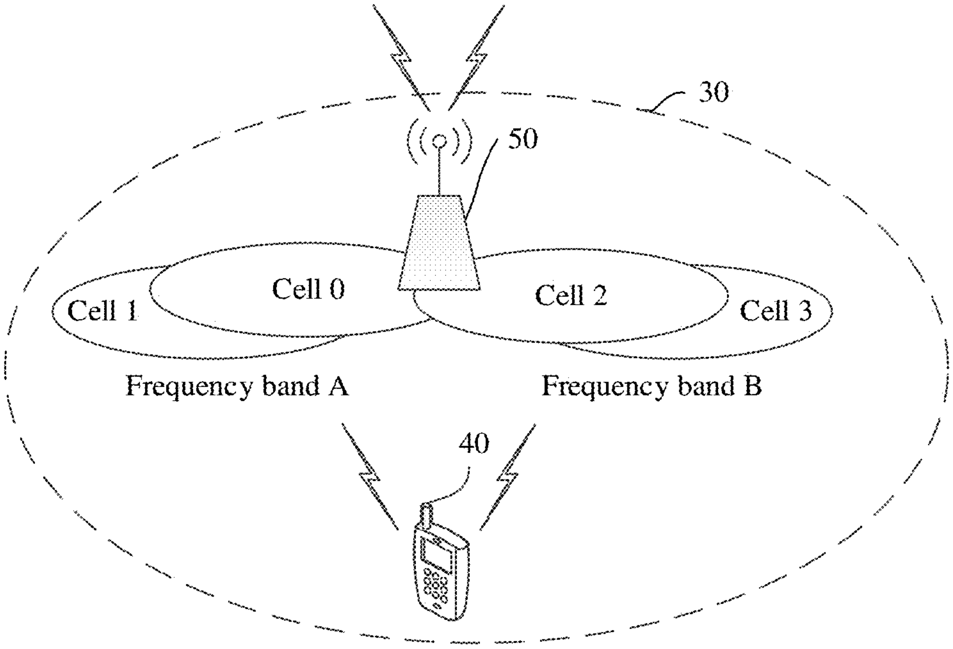
FIG. 3 is a schematic diagram of an application scenario of a communication system according to at least one embodiment.

FIG. 3 is a schematic diagram of an application scenario of a communication system 30 used in a carrier aggregation method according to at least one embodiment. As shown in FIG. 3, the communication system 30 includes a network device 50 and one or more terminal devices 40 (only one terminal device 40 is shown in FIG. 3) connected to the network device 50. The terminal device 40 is connected to the network device 50 in a wireless manner. Optionally, different terminal devices 40 communicates with each other. The terminal device 40 is located at a fixed position, or is mobile.

FIG. 3 is only a schematic diagram. Although not shown, the communication system 30 further includes another network device. For example, the communication system 30 further includes one or more of a core network device, a wireless relay device, and a wireless backhaul device. This is not specifically limited herein. The network device is connected to the core network device in a wireless or wired manner. The core network device and the network device 50 are independent and different physical devices. Alternatively, a function of the core network device and a logical function of the network device 50 is integrated into a same physical device. Alternatively, some functions of the core network device and some functions of the network device 50 are integrated into one physical device. This is not specifically limited in at least one embodiment.

As shown in FIG. 3, a cell 0 and a cell 1 are located in a frequency band A, and a cell 2 and a cell 3 are located in a frequency band B. The terminal device 40 accesses the cell 0, the cell 1, the cell 2, and the cell 3, and uses bandwidth that is obtained through carrier aggregation and that respectively corresponds to the cell 0, the cell 1, the cell 2, and the cell 3. The network device 50 transmits a downlink signal to the terminal device 40 or receive an uplink signal from the terminal device 40 through the cell 0, the cell 1, the cell 2, or the cell 3. Correspondingly, the terminal device receives the downlink signal from the network device 50, or transmit the uplink signal to the network device 50 through the cell 0, the cell 1, the cell 2, or the cell 3. In the carrier aggregation method provided in at least one embodiment, the network device 50 is configured to transmit first information to the terminal device 40, where the first information indicates a plurality of activated serving cells configured by the network device 50 for the terminal device 40, and the plurality of activated serving cells are located in at least two different frequency bands. The terminal device 40 is configured to: receive the first information from the network device 50, and determine, among the plurality of activated serving cells, a reference cell in each of the at least two frequency bands corresponding to the plurality of activated serving cells. The terminal device 40 is further configured to determine a transmission direction of the terminal device 40 in each of the plurality of activated serving cells, where in the frequency band, transmission directions of the terminal device 40 in the reference cell and another cell are the same, and the another cell is an activated serving cell other than the reference cell in the frequency band. A specific implementation and technical effects of this solution are described in detail in subsequent method embodiments, and details are not described herein again.

Optionally, the terminal device 40 in at least one embodiment is a device configured to implement a wireless communication function, for example, a terminal or a chip that is used in the terminal. The terminal is also referred to as user equipment (UE), a mobile station, a mobile terminal, or the like. The terminal is a mobile phone, a tablet computer, a computer with a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form used by the terminal device are not limited in at least one embodiment.

Optionally, the network device 50 in at least one embodiment is a device that connects the terminal device 40 to a wireless network, and is a base station, an evolved NodeB (eNodeB), a transmission reception point (TRP), a next generation NodeB (gNB) in a 5G mobile communication system, a base station in a future mobile communication system, an access node in a wireless-fidelity (Wi-Fi) system, or the like, or is a module or a unit that implements some functions of the base station, for example, is a central unit (CU), or is a distributed unit (DU). A specific technology and a specific device form used by the network device are not limited in at least one embodiment. In at least one embodiment, unless otherwise specified, the network device is a radio access network device.

Optionally, the terminal device 40 and the network device 50 in at least one embodiment are deployed on land, including an indoor or outdoor device, or a handheld or vehicle-mounted device, are deployed on a water surface, or are deployed on an airplane, a balloon, or an artificial satellite in the air. Application scenarios of the terminal device 40 and the network device 50 are not limited in at least one embodiment.

Optionally, the terminal device 40 and the network device 50 in at least one embodiment communicates with each other by using a licensed spectrum, communicates with each other by using an unlicensed spectrum, or communicates with each other by using the licensed spectrum and the unlicensed spectrum. The terminal device 40 and the network device 50 communicates with each other by using a spectrum below 6 gigahertz (GHz), communicates with each other by using a spectrum above 6 GHz, or communicates with each other by using the spectrum below 6 GHz and the spectrum above 6 GHz. Spectrum resources used between the terminal device 40 and the network device 50 are not limited in at least one embodiment.

Optionally, the terminal device 40 and the network device 50 in at least one embodiment is also referred to as a communication apparatus. The communication apparatus is a general-purpose device or a dedicated device. This is not specifically limited in at least one embodiment.

Figure 4:
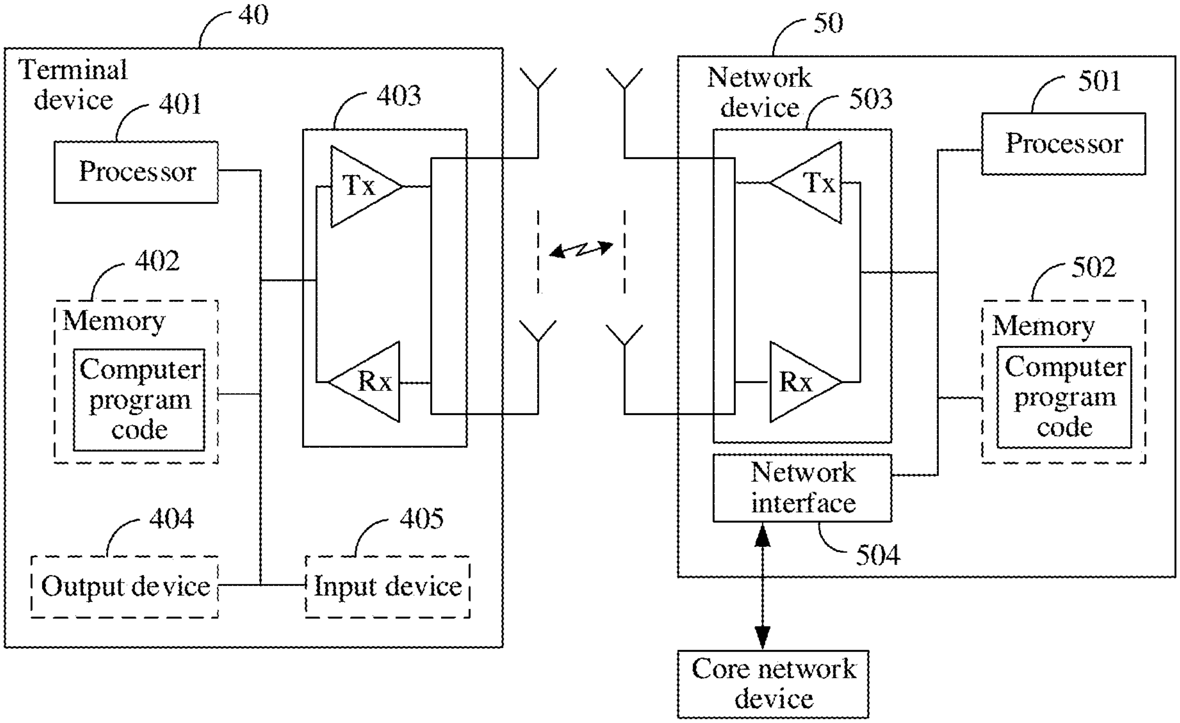
FIG. 4 is a schematic diagram of structures of a terminal device and a network device according to at least one embodiment.

Optionally, FIG. 4 is a schematic diagram of structures of the terminal device 40 and the network device 50 according to at least one embodiment.

The terminal device 40 includes at least one processor 401 and at least one transceiver 403. Optionally, the terminal device 40 further includes at least one memory 402, at least one output device 404, or at least one input device 405.

The processor 401, the memory 402, and the transceiver 403 are connected through a communication line. The communication line includes a path to transfer information between the components.

The processor 401 is a general-purpose central processing unit (CPU), or is another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor is a microprocessor, or is any conventional processor. In a specific implementation, in at least one embodiment, the processor 401 alternatively includes a plurality of CPUs, and the processor 401 is a single-core processor or a multi-core processor. The processor herein is one or more devices, circuits, or processing cores configured to process data.

The memory 402 is an apparatus with a storage function. For example, the memory 402 is a read-only memory (ROM) or another type of static storage device that stores static information and instructions, or a random access memory (RAM) or another type of dynamic storage device that stores information and instructions, or is a programmable read-only memory (PROM), an erasable programmable read-only memory (EPROM), an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that is used to carry or store expected program code in a form of an instruction or a data structure and that is accessed by a computer, but is not limited thereto. The memory 402 exits independently, and is connected to the processor 401 through the communication line. Alternatively, the memory 402 is integrated with the processor 401.

The memory 402 is configured to store computer-executable instructions for performing the solutions in at least one embodiment, and the processor 401 controls execution. Specifically, the processor 401 is configured to execute the computer-executable instructions stored in the memory 402, to implement the carrier aggregation method in at least one embodiment.

Alternatively, optionally, in at least one embodiment, the processor 401 performs a processing-related function in the carrier aggregation method provided in the following embodiments of this application, and the transceiver 403 is responsible for communicating with another device or a communication network. This is not specifically limited in at least one embodiment.

Optionally, the computer-executable instructions in at least one embodiment is also referred to as application program code or computer program code. This is not specifically limited in at least one embodiment.

The transceiver 403 is configured to communicate, by using any transceiver-type apparatus, with the another device or the communication network, for example, Ethernet, a radio access network (RAN), or a wireless local area network (WLAN). The transceiver 403 includes a transmitter (Tx) and a receiver (Rx).

The output device 404 communicates with the processor 401, and displays information in a plurality of manners. For example, the output device 404 is a liquid crystal display (LCD), a light emitting diode (LED) display device, a cathode ray tube (CRT) display device, or a projector.

The input device 405 communicates with the processor 401, and receives an input from a user in a plurality of manners. For example, the input device 405 is a mouse, a keyboard, a touchscreen device, a sensor device, or the like.

The network device 50 includes at least one processor 501, at least one transceiver 503, and at least one network interface 504. Optionally, the network device 50 further includes at least one memory 502. The processor 501, the memory 502, the transceiver 503, and the network interface 504 are connected through a communication line. The network interface 504 is configured to connect to a core network device through a link (for example, an Si interface), or connect to a network interface of another network device through a wired or wireless link (for example, an X2 interface) (not shown in FIG. 4). This is not specifically limited in at least one embodiment. In addition, for related descriptions of the processor 501, the memory 502, and the transceiver 503, refer to descriptions of the processor 401, the memory 402, and the transceiver 403 in the terminal device 40. Details are not described herein again.

Figure 5:
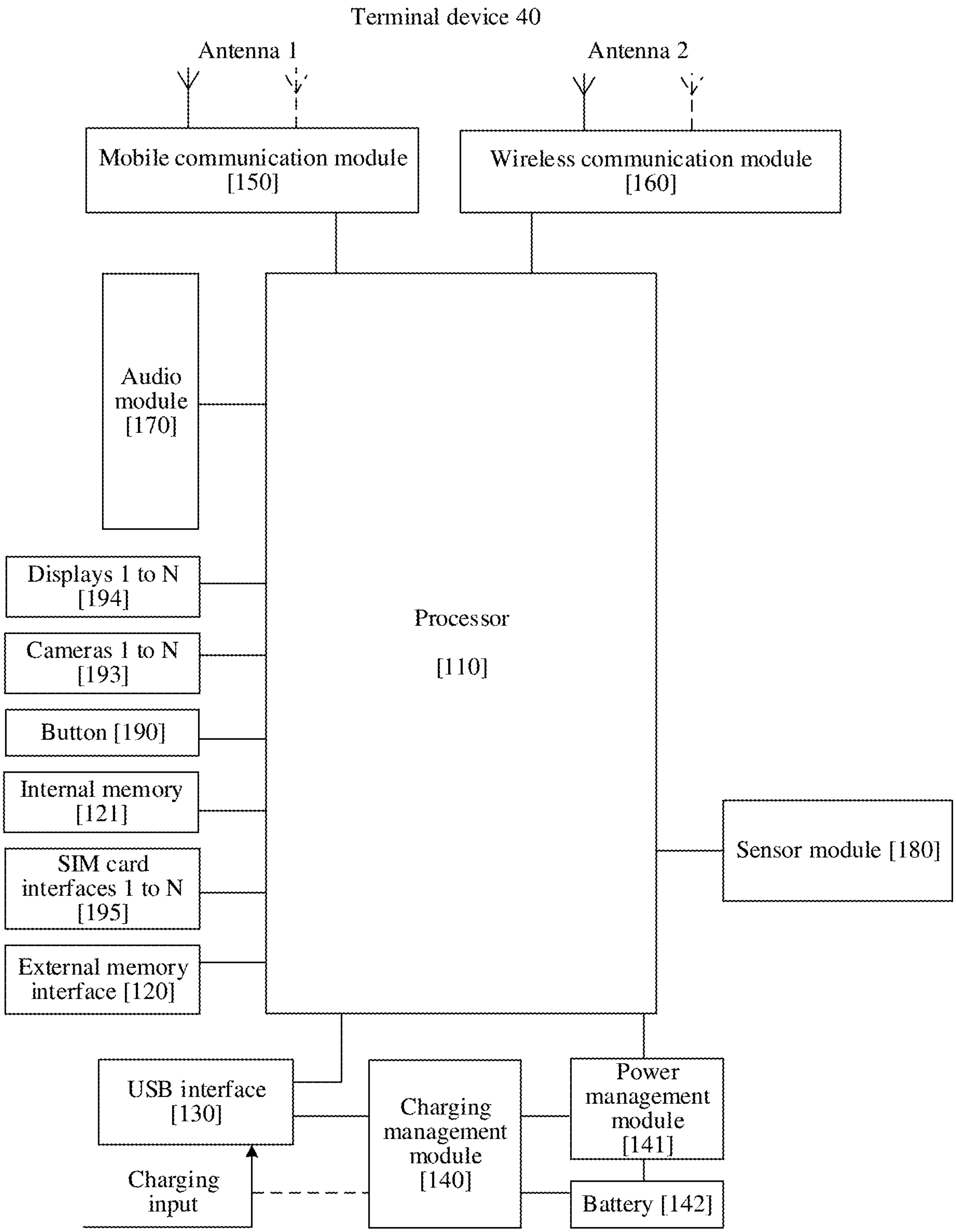
FIG. 5 is a schematic diagram of another structure of a terminal device according to at least one embodiment.

With reference to the schematic diagram of the structure of the terminal device 40 shown in FIG. 4, for example, FIG. 5 shows a specific structural form of the terminal device 40 according to at least one embodiment.

In at least one embodiment, a function of the processor 401 in FIG. 4 is implemented by using a processor 110 in FIG. 5.

In at least one embodiment, a function of the transceiver 403 in FIG. 4 is implemented by using an antenna 1, an antenna 2, a mobile communication module 150, a wireless communication module 160, or the like in FIG. 5. The mobile communication module 150 provides a solution that is applied to the terminal device 40 and that includes a wireless communication technology such as LTE, NR, future mobile communication, or the like. The wireless communication module 160 provides a solution that is applied to the terminal device 40 and that includes a wireless communication technology such as a WLAN (for example, a Wi-Fi network), Bluetooth (BT), a global navigation satellite system (GNSS), frequency modulation (FM), near field communication (NFC), infrared, or the like. In at least one embodiment, in the terminal device 40, the antenna 1 and the mobile communication module 150 are coupled, and the antenna 2 and the wireless communication module 160 are coupled, so that the terminal device 40 communicates with a network and another device by using the wireless communication technology.

In at least one embodiment, a function of the memory 402 in FIG. 4 is implemented by using an internal memory 121, an external memory connected to an external memory interface 120, or the like in FIG. 5.

In at least one embodiment, a function of the output device 404 in FIG. 4 is implemented by using a display 194 in FIG. 5.

In at least one embodiment, a function of the input device 405 in FIG. 4 is implemented by using a mouse, a keyboard, a touchscreen device, or a sensor module 180 in FIG. 5.

In at least one embodiment, as shown in FIG. 4, the terminal device 40 further includes one or more of an audio module 170, a camera 193, a button 190, a SIM card interface 195, a USB interface 130, a charging management module 140, a power management module 141, and a battery 142.

The structure shown in FIG. 5 does not constitute a specific limitation on the terminal device 40. For example, in at least one embodiment, the terminal device 40 includes more or fewer components than those shown in the figure, combine some components, split some components, or have different component arrangements. The components shown in the figure are implemented by using hardware, software, or a combination of software and hardware.

With reference to FIG. 1*a* to FIG. 5, the following describes the carrier aggregation method provided in at least one embodiment in detail by using an example in which the network device 50 shown in FIG. 3 interacts with any terminal device 40.

Names of messages between network elements, names of parameters in the messages, or the like in the following embodiments described herein are merely examples, and there are other names in a specific implementation. This is not specifically limited in at least one embodiment. In addition, processing performed by a single execution body shown in at least one embodiment is alternatively divided to be performed by a plurality of execution bodies, and the execution bodies are logically and/or physically separated. For example, processing performed by an access network device is divided to be performed by at least one of a central unit (CU), a distributed unit (DU), and a radio unit (RU).

Figure 6:
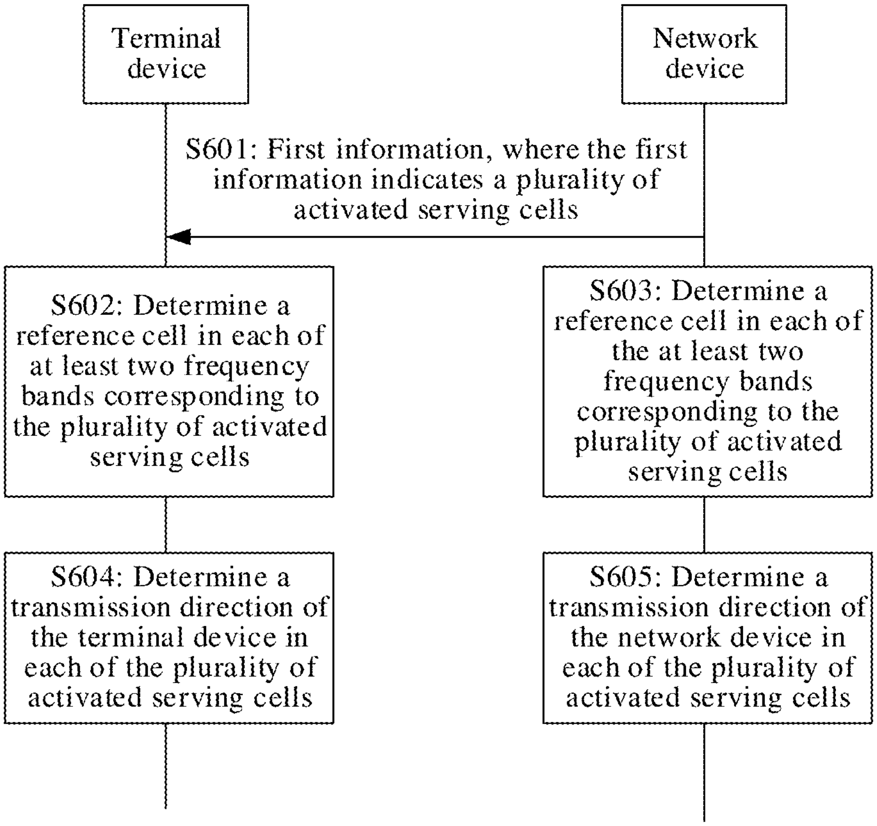
FIG. 6 is a schematic flowchart of a carrier aggregation method according to at least one embodiment.

FIG. 6 shows a carrier aggregation method according to at least one embodiment. The carrier aggregation method includes the following steps S601 to S605.

S601: A network device transmits first information to a terminal device. Correspondingly, the terminal device receives the first information from the network device, where the first information indicates a plurality of activated serving cells configured by the network device for the terminal device, and the plurality of activated serving cells are located in at least two different frequency bands.

S602: The terminal device determines, among the plurality of activated serving cells, a reference cell in each of the at least two frequency bands corresponding to the plurality of activated serving cells.

S603: The network device determines, among the plurality of activated serving cells, a reference cell in each of the at least two frequency bands corresponding to the plurality of activated serving cells.

S604: The terminal device determines a transmission direction of the terminal device in each of the plurality of activated serving cells, where in the frequency band, transmission directions of the terminal device in the reference cell and another cell are the same, and the another cell is an activated serving cell other than the reference cell in the frequency band.

S605: The network device determines a transmission direction of the network device in each of the plurality of activated serving cells, where in the frequency band, transmission directions of the network device in the reference cell and another cell are the same, and the another cell is an activated serving cell other than the reference cell in the frequency band.

In at least one embodiment, a cell (including a serving cell or an activated serving cell) is a cell corresponding to a network device, for example, a base station. The cell is long to a macro base station, or is long to a base station corresponding to a small cell. The small cell includes: a metro cell, a micro cell, a pico cell, a femto cell, or the like. This is described herein in a centralized manner, and details are not described again subsequently.

Steps S601 to S605 are described in detail below.

For step S601, in at least one embodiment, the terminal device determines, based on the received first information from the network device, the activated serving cell configured by the network device for the terminal device, where the plurality of activated serving cells are located in the at least two different frequency bands. In other words, at least one embodiment is applied to an inter-band carrier aggregation scenario.

In at least one embodiment, the plurality of activated serving cells that are configured by the network device for the terminal device and that are indicated by the first information belong to secondary cells (SCells), and a state of the secondary cell is changed. For example, the secondary cell is activated or deactivated by the terminal device or the network device. A specific implementation is described below. Before step S601, the terminal device selects one serving cell in response to initially accessing the network device, and establishes a radio resource control (RRC) connection. The serving cell is referred to as a primary cell (PCell), and the primary cell always remains in an active state. Both the primary cell and the secondary cell are referred to as serving cells.

A quantity of frequency bands in different frequency bands is not limited in at least one embodiment. In addition, a quantity of activated serving cells in different frequency bands is also not limited in at least one embodiment. For example, a quantity of activated serving cells in a frequency band A are the same as a quantity of activated serving cells in a frequency band B. For example, both are two activated serving cells. Alternatively, a quantity of activated serving cells in the frequency band A is different from a quantity of activated serving cells in the frequency band B. For example, there is one activated serving cell in the frequency band A, and there are two activated serving cells in the frequency band B. In at least one embodiment, the activated serving cells in the different frequency bands is also equivalent to CCs in the different frequency bands.

In at least one embodiment, the activated serving cell is a serving cell that is activated in the serving cells configured by the network device for the terminal device. The terminal performs data communication (for example, receiving data or transmitting data), through the activated serving cell, with a network device to which the activated serving cell belongs. For example, the network device configures the activated serving cell for the terminal device based on a service volume of the terminal device. In response to there being a large service volume of the terminal device, the network device activates a large quantity of serving cells for the terminal device. In response to there being a small service volume of the terminal device, the network device configures a small quantity of activated serving cells for the terminal device.

The network device first learns of capability information of the terminal device, and determine that the terminal device supports CA. Further, the network device determines that the terminal device supports inter-band CA, and then configures the CCs in the different frequency bands for the terminal device. Therefore, optionally, before step S601, the carrier aggregation method provided in at least one embodiment further includes: The network device transmits a first message to the terminal device, where the first message is for requesting the capability information of the terminal device from the terminal device. Correspondingly, after receiving the first message from the network device, the terminal device transmits the capability information of the terminal device to the network device, where the capability information of the terminal device includes CA capability information of the terminal device. For example, the CA capability information of the terminal device includes information such as a band combination supported by the terminal device and/or supporting inter-band CA of the terminal device. According to this solution, the network device determines, based on the capability information of the terminal device, that the terminal device supports CA.

In at least one embodiment, the first message is an RRC message, and the capability information of the terminal device is alternatively carried in the RRC message. For example, the network device transmits the first message to the terminal device by using UE capability enquiry signaling, and the terminal device transmits the capability information of the terminal device to the network device by using UE capability information signaling.

In at least one embodiment, the terminal device supports simultaneous transmission and reception on CCs located in different frequency bands, in other words, the terminal device supports simultaneous transmission and reception on CCs in inter-band CA, to implement simultaneous transmission and reception on CCs in different frequency bands. To enable the network device to learn that the terminal device supports simultaneous transmission and reception on CCs in different frequency bands, optionally, before step S601, the method further includes: The terminal device transmits second information to the network device, where the second information indicates that the terminal device supports simultaneous transmission and reception on carriers in different frequency bands. Correspondingly, the network device receives the second information from the terminal device. According to this solution, the network device determines, based on the second information, that the terminal device supports simultaneous transmission and reception on CCs in different frequency bands, so that the network device and the terminal device synchronously determine the transmission directions in the reference cell and the CC based on the carrier aggregation method provided in at least one embodiment.

The terminal device supports simultaneous transmission and reception on CCs in different frequency bands is also referred to as a capability of the terminal device. Therefore, in at least one embodiment, the second information is included in the capability information that is of the terminal device and that is transmitted by the terminal device to the network device. Certainly, the second information is alternatively transmitted simultaneously with the capability information that is of the terminal device and that is transmitted by the terminal device to the network device as described above. In other words, the second information and the capability information are carried in a same message. Alternatively, the second information not transmitted simultaneously with the capability information of the terminal device. This is not limited in at least one embodiment.

From the foregoing descriptions, in S601, the activated serving cell is a serving cell that is activated in the serving cells configured by the network device for the terminal device. Optionally, to enable the terminal device to learn of the serving cell configured by the network device for the terminal device, before S601, the method provided in at least one embodiment further includes: The network device transmits third information to the terminal device. Correspondingly, the terminal device receives the third information from the network device, where the third information indicates a plurality of serving cells configured by the network device for the terminal device, and the plurality of serving cells include the plurality of activated serving cells. According to this solution, the terminal device determines the serving cell configured by the network device for the terminal device based on the third information.

Optionally, the network device configures the plurality of serving cells for the terminal device based on the capability information that is of the terminal device and that is transmitted by the terminal device, and transmit the third information to the terminal device.

For example, the third information includes information such as serving cell indexes of the plurality of serving cells and/or frequencies respectively corresponding to the plurality of serving cells. For example, in response to the third information including the serving cell indexes of the plurality of serving cells, the terminal device determines the configured serving cell based on the serving cell index.

For example, the network device transmits the third information to the terminal device by using RRC reconfiguration signaling.

In step S601, the first information indicates the plurality of activated serving cells configured by the network device for the terminal device. In at least one embodiment, the first information includes a cell state (sCellState) of one or more of the plurality of serving cells, and the plurality of activated serving cells are serving cells having corresponding cell states among the plurality of serving cells. The terminal device determines, based on the cell state included in the first information, the serving cell having the cell state as the activated serving cell configured by the network device. In this manner, the first information and the third information are simultaneously transmitted. In other words, the first information and the third information are carried in a same message. For example, the terminal device determines, based on the serving cell index and the cell state corresponding to the serving cell index that are in the message, the serving cell that corresponds to the serving cell index and that correspondingly has the cell state as the activated serving cell.

For example, in at least one embodiment, a value of the cell state is activated. In response to the network device configuring cell state information for the serving cell, a value of the cell state information is activated.

In at least one embodiment, the first information includes indication information of a serving cell index of the activated serving cell. The terminal device determines the serving cell index based on the indication information that is of the serving cell index and that is included in the first information, and determine a serving cell corresponding to the serving cell index as the activated serving cell. In this manner, the first information is transmitted independently.

For example, the first information includes information about a bit corresponding to the serving cell. The information about the bit corresponding to the serving cell includes a location of the bit and a value of the bit. The location of the bit is the indication information of the serving cell index, and indicates the serving cell index. The value of the bit represents an assigned value of the serving cell, and the assigned value represents the state of the serving cell. For example, in the first information, a location of a bit is an $i^{th}$ bit in locations of all bits corresponding to the serving cell, where i is a positive integer greater than or equal to 1, indicating that a serving cell index of a serving cell represented by the bit is i, and a value of the bit is 1, indicating that an assigned value of the serving cell represented by the bit is 1, where the assigned value of 1 indicates that the serving cell is activated. The terminal device determines, based on the information that is about the bit corresponding to the serving cell and that is in the first information, that the serving cell whose serving cell index is i is the activated serving cell configured by the network device.

In at least one embodiment, in response to the indication information that is of the serving cell index and that is included in the first information indicating that the serving cell whose serving cell index is i is the activated serving cell, but the serving cell configured by the network device for the terminal device not including the serving cell whose serving cell index is i, the terminal device does not determine the serving cell whose serving cell index is i as the activated serving cell.

In at least one embodiment, optionally, in response to the first information and the third information being simultaneously transmitted, the network device transmits the first information and the third information to the terminal device by using the RRC reconfiguration signaling. Alternatively, in response to the first information being transmitted independently, the network device transmits the first information to the terminal device by using media access control (MAC) layer signaling.

For step S602, the terminal device determines, according to a pre-configured rule among the plurality of activated serving cells indicated by the first information, the reference cell in each of the at least two frequency bands corresponding to the plurality of activated serving cells.

A specific example is used for explanation. There are three activated serving cells in the frequency band A, two activated serving cells in the frequency band B, and one activated serving cell in a frequency band C. The terminal device separately determines a reference cell A in the frequency band A from the three activated serving cells in the frequency band A, determines a reference cell B in the frequency band B from the two activated serving cells in the frequency band B, and determines the activated serving cell in the frequency band C as a reference cell.

Optionally, the terminal device determines an activated serving cell having a smallest serving cell index in each of the at least two frequency bands corresponding to the plurality of activated serving cells as the reference cell in the frequency band. For example, in the frequency band A, a serving cell index of an activated serving cell A is 2, a serving cell index of an activated serving cell B is 3, and a serving cell index of an activated serving cell C is 4. Based on values of the serving cell indexes respectively corresponding to the activated serving cells A, B, and C, the terminal device determines the activated serving cell A as a reference cell in the frequency band A.

At least one embodiment further provides a manner of determining the reference cell among the plurality of activated serving cells. In this manner, one reference cell is determined from the activated serving cells on the at least two different frequency bands. In other words, a same reference cell is determined on the at least two different frequency bands. For example, there are four different frequency bands in total: A, B, C, and D. The terminal device determines a reference cell 1 of the frequency band A and the frequency band B from the activated serving cells in the frequency band A and the frequency band B. The terminal device determines a reference cell 2 of the frequency band C and the frequency band D from the activated serving cells in the frequency band C and the frequency band D. In other words, the frequency band A and the frequency band B correspond to the same reference cell 1, and the frequency band C and the frequency band D correspond to the same reference cell 2.

Optionally, the network device transmits, to the terminal device, indication information that indicates the manner of determining the reference cell by the terminal device, and the terminal device selects, based on the received indication information, different manners of determining the reference cell.

For step S603, for the network device, to keep synchronous with the terminal device, the network device determines the same reference cell as the terminal device. To enable the network device and the terminal device to determine the same reference cell, in at least one embodiment, after the terminal device determines the reference cell on each frequency band, the terminal device transmits, to the network device, information about the reference cell that is in the frequency band and that is determined by the terminal device, and the network device determines the reference cell in the frequency band based on the received information.

In at least one embodiment, the network device and the terminal device configures a same rule for determining the reference cell, so that the network device and the terminal device determine the same reference cell. For details, refer to the foregoing descriptions of step S602, and details are not described herein again.

For step S604, the terminal device determines the transmission direction of each of the plurality of activated serving cells on one symbol. For a relationship between a transmission direction and simultaneous transmission and reception, refer to the foregoing descriptions, and details are not described herein again.

In at least one embodiment, the terminal device determines, based on information such as transmission directions that are of the reference cell and another cell configured in a higher layer and that are on one symbol, a signal transmitting or signal receiving behavior of the higher layer configuration, and a signal transmitting or receiving behavior that is indicated by downlink control information (DCI), the transmission directions on the symbol in the reference cell and the another cell according to the pre-configured rule. Finally, in the frequency band, the transmission directions of the terminal device in the reference cell and the another cell are the same.

In at least one embodiment, another cell is able to not "follows" the transmission direction of the reference cell. In other words, the transmission direction of the reference cell is not determined first, and then the transmission direction of the another cell is kept consistent with the transmission direction of the reference cell. Instead, the transmission direction of the reference cell is finally consistent with that of the another cell on each frequency band according to the pre-configured rule. For details, refer to how to determine the transmission directions of the reference cell and the another cell in an existing standard. Details are not described herein again.

In at least one embodiment, in response to the transmission direction of the activated serving cell being determined, the activated serving cell has no transmission direction. For example, in response to a transmission direction of another cell not being the same as the transmission direction of the reference cell in one frequency band, the another cell finally has no transmission direction. In other words, neither reception nor transmission is performed by the terminal device in the cell.

Figure 7:
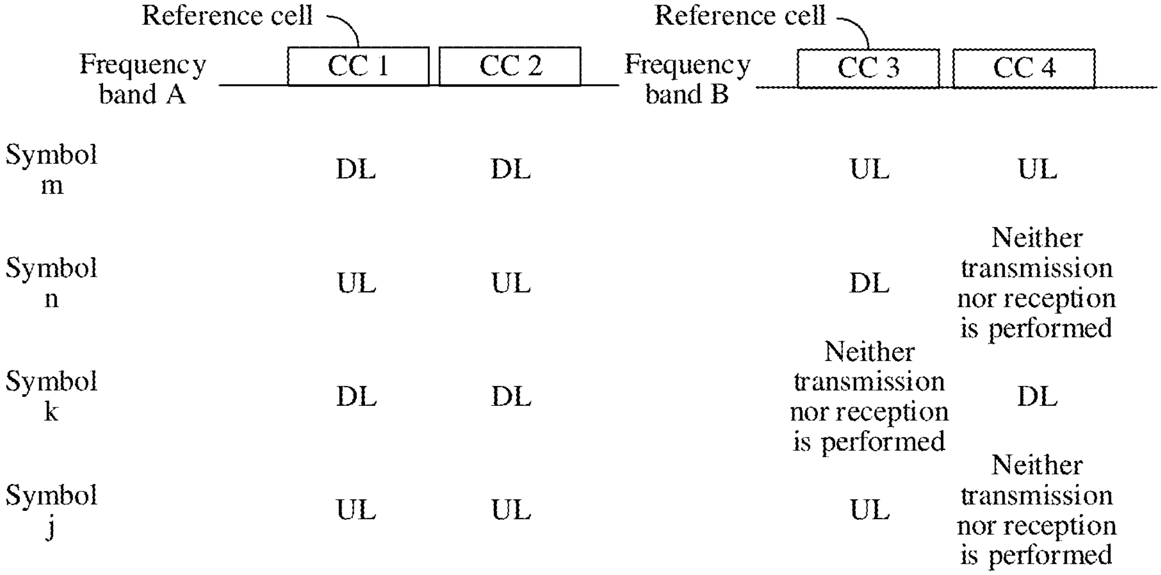
FIG. 7 is a schematic diagram of determining a transmission direction on a CC according to at least one embodiment.

For ease of understanding, a specific example is used for description. As shown in FIG. 7, there are two different frequency bands: a frequency band A and a frequency band B. A CC 1 is a reference cell in the frequency band A, a CC 2 is another cell in the frequency band A, a CC 3 is a reference cell in the frequency band B, and a CC 4 is another cell in the frequency band B. The terminal device determines transmission directions on the CC 1, the CC 2, the CC 3, and the CC 4 on symbols m, n, k, and j according to a rule that "the transmission directions of the terminal device in the reference cell and the another cell on each frequency band are the same". Finally, in the frequency band A, the transmission directions on the CC 1 and the CC 2 on the symbol m are DL, the transmission directions on the CC 1 and the CC 2 on the symbol n are UL, the transmission directions on the CC 1 and the CC 2 on the symbol k are DL, and the transmission directions on the CC 1 and the CC 2 on the symbol j are UL. In the frequency band B, in response to the CC 3 and the CC 4 having the transmission directions, the transmission directions are consistent. For example, the transmission directions on the CC 1 and the CC 2 on the symbol m are UL. On the symbol n, the transmission direction on the CC 3 is DL, and the CC 4 has no transmission direction, that is, neither transmission nor reception is performed. On the symbol k, neither transmission nor reception is performed in the CC 3, and the transmission direction on the CC 4 is DL. On the symbol j, the transmission direction on the CC 3 is UL, and neither transmission nor reception is performed in the CC 4. On the symbol m and the symbol n, the transmission directions on the CC in the frequency band A and the CC in the frequency band B are different, and the terminal device implements simultaneous transmission and reception on the CCs in the frequency band A and the frequency band B.

For step S605, to keep the network device synchronous with the terminal device, the network device and the terminal device configures a same rule for determining the transmission directions of the reference cell and the another cell on each frequency band, to determine the transmission directions of the network device in the reference cell and the another cell in the frequency band. Finally, in the frequency band, the transmission directions of the network device in the reference cell and the another cell are the same. For details, refer to the foregoing descriptions of step S604. Details are not described herein again.

According to the carrier aggregation method provided in at least one embodiment, the reference cell of the frequency band is determined in the frequency band, so that the transmission directions on the CCs in the different frequency bands in inter-band CA are independently determined, to enable the terminal device that supports simultaneous transmission and reception on CCs in different frequency bands to implement simultaneous transmission and reception on CCs in different frequency bands in the inter-band CA scenario.

The processor 401 in the terminal device 40 shown in FIG. 4 invokes the application program code stored in the memory 402 to instruct the terminal device to perform actions of the terminal device in steps S601 to S605. The processor 501 in the network device 50 shown in FIG. 4 invokes the application program code stored in the memory 502 to instruct the network device to perform actions of the network device in steps S601 to S605. This is not limited in at least one embodiment.

Optionally, the carrier aggregation method provided in at least one embodiment further includes updating the serving cell or the activated serving cell for the terminal device. The network device updates the serving cell for the terminal device based on a CA-related measurement event. For a specific implementation, refer to a conventional technology. Details are not described herein again.

For example, the network device adds an activated serving cell or deactivate the activated serving cell for the terminal device based on a changed service volume of the terminal device. For example, in response to the service volume of the terminal device increasing, the activated serving cell is added to the terminal device, or in response to the service volume of the terminal device decreasing, the activated serving cell of the terminal device is deactivated. For a deactivated serving cell, the terminal device cannot perform data communication (for example, data receiving or data transmitting), through the deactivated serving cell, with the network device to which the deactivated serving cell belongs. For how to add the activated serving cell for the terminal device, refer to the foregoing descriptions of step S601. Details are not described herein again.

In at least one embodiment, a method for deactivating the activated serving cell provided in at least one embodiment includes: The network device transmits fourth information to the terminal device, and the terminal device receives the fourth information from the network device, where the fourth information includes a deactivation timer of one or more of the plurality of activated serving cells. The terminal device deactivates, based on the fourth information from the one or more of the plurality of activated serving cells, an activated serving cell in which no data is obtained through listening during running of the deactivation timer.

In this manner, the network device configures the deactivation timer for the serving cell. After the serving cell is activated (where the serving cell is configured as the activated serving cell), the deactivation timer starts to run. In response to no service or control data being obtained through listening in an activated serving cell during running of a deactivation timer of the activated serving cell, the terminal device deactivates the activated serving cell by itself after the deactivation timer expires. Optionally, a deactivation timer is not configured for a serving cell configured with a physical uplink control channel (PUCCH).

In at least one embodiment, the fourth information is simultaneously transmitted with the first information or the third information. For example, in response to the fourth information and the third information being simultaneously transmitted, the network device transmits the fourth information and the third information to the terminal device by using the RRC reconfiguration signaling.

In at least one embodiment, a method for deactivating the activated serving cell provided in at least one embodiment includes: The network device transmits fifth information to the terminal device, and the terminal device receives the fifth information from the network device, where the fifth information indicates the deactivated serving cell configured by the network device for the terminal device. The terminal device deactivates, among the plurality of activated serving cells, the deactivated serving cell indicated by the fifth information.

In this manner, the terminal device deactivates, based on the fifth information among the plurality of activated serving cells, the deactivated serving cell indicated by the fifth information. For example, the fifth information includes indication information of a serving cell index of the deactivated serving cell, and the terminal device determines the serving cell index of the deactivated serving cell based on the fifth information, and deactivate an activated serving cell corresponding to the serving cell index.

For example, the fifth information includes information about a bit corresponding to the serving cell. The information about the bit corresponding to the serving cell includes a location of the bit and a value of the bit. The location of the bit is the indication information of the serving cell index, and indicates the serving cell index. The value of the bit represents an assigned value of the serving cell, and the assigned value represents the state of the serving cell. For example, in the fifth information, a location of a bit is an $i^{th}$ bit in locations of all bits corresponding to the serving cell, where I is a positive integer greater than or equal to 1, indicating that a serving cell index of a serving cell represented by the bit is i, and a value of the bit is 0, indicating that an assigned value of the serving cell represented by the bit is 0, where the assigned value of 0 indicates that the serving cell is a deactivated serving cell. The terminal device deactivates, based on the information that is about the bit corresponding to the serving cell and that is in the fifth information, an activated serving cell whose serving cell index is i.

In at least one embodiment, in response to the indication information that is of the serving cell index and that is included in the first information indicating that the serving cell whose serving cell index is i is the deactivated serving cell, but the serving cell configured by the network device for the terminal device not including the serving cell whose serving cell index is i, the terminal device does not deactivate the serving cell whose serving cell index is i.

In at least one embodiment, optionally, in response to the first information including the indication information of the serving cell index of the activated serving cell, the first information and the fifth information are simultaneously transmitted. In other words, the first information and the fifth information are carried in a same message. For example, in response to the first information and the fifth information being carried in the same message, the message indicates whether a state of each of all serving cells is activated or deactivated. For example, the message includes information about a bit corresponding to each of all the serving cells. In response to there being n serving cells, there are also n bits corresponding to the serving cells. The information about the bit corresponding to the serving cell includes a location of the bit and a value of the bit. The location of the bit is the indication information of the serving cell index, and indicates the serving cell index. The value of the bit represents an assigned value of the serving cell, and the assigned value represents the state of the serving cell. An assigned value of 1 indicates that the serving cell is an activated serving cell, and an assigned value of 0 indicates that the cell is a deactivated serving cell. The terminal device determines, based on the information that is about the bit corresponding to the serving cell and that is in the message, the activated serving cell and the deactivated serving cell in all the serving cells.

In at least one embodiment, for example, the network device transmits the fifth information to the terminal device by using MAC signaling.

After the network device updates the serving cell or the activated serving cell for the terminal device, in response to the activated serving cell changing, the terminal device re-determines a reference cell on each frequency band based on a changed activated serving cell. For a specific determining process, refer to the foregoing descriptions of step S602. Details are not described herein again.

Figure 8:
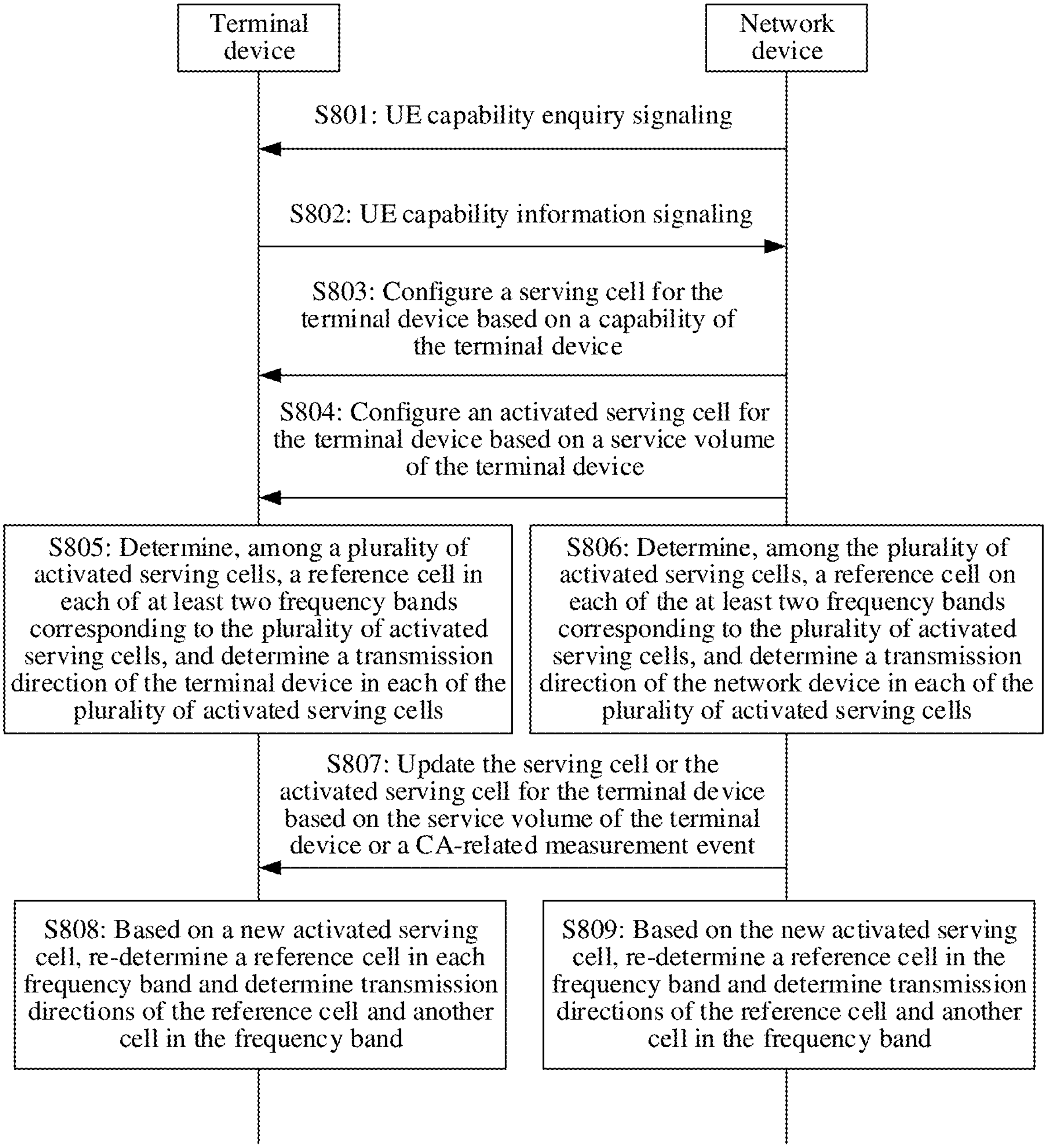
FIG. 8 is another schematic flowchart of a carrier aggregation method according to at least one embodiment.

In conclusion, for example, an overall procedure of at least one embodiment is shown in FIG. 8, and includes steps S801 to S809.

S801: A network device transmits a first message to a terminal device, and correspondingly, the terminal device receives the first message from the network device.

For example, refer to the foregoing related descriptions of the first message in step S601. As shown in FIG. 8, the first message is, for example, UE capability enquiry signaling.

S802: The terminal device transmits capability information of the terminal device to the network device, and correspondingly, the network device receives the capability information of the terminal device from the terminal device.

For example, refer to the foregoing related descriptions of the capability information of the terminal device in step S601. As shown in FIG. 8, the capability information of the terminal device is carried, for example, by using UE capability information signaling.

S803: The network device configures a serving cell for the terminal device based on a capability of the terminal device, and indicates the serving cell to the terminal device. For details, refer to the foregoing related descriptions of the third information in step S601. Details are not described herein again.

S804: The network device configures an activated serving cell for the terminal device based on a service volume of the terminal device. For details, refer to the foregoing descriptions of step S601. Details are not described herein again.

S805: The terminal device determines, among a plurality of activated serving cells, a reference cell on each of at least two frequency bands corresponding to the plurality of activated serving cells, and determines a transmission direction of the terminal device in each of the plurality of activated serving cells. For details, refer to the foregoing descriptions of step S602 and step S604. Details are not described herein again.

S806: The network device determines, among the plurality of activated serving cells, a reference cell in each of the at least two frequency bands corresponding to the plurality of activated serving cells, and determines a transmission direction of the network device in each of the plurality of activated serving cells. For details, refer to the foregoing descriptions of step S603 and step S605. Details are not described herein again.

S807: The network device updates the configured serving cell or activated serving cell for the terminal device based on a changed service volume of the terminal device or a CA-related measurement event. For details, refer to the foregoing related descriptions. Details are not described herein again.

S808: In response to the activated serving cell changing, based on a new activated serving cell, the terminal device re-determines a reference cell on each frequency band and determines transmission directions of the reference cell and another cell in the frequency band. For details, refer to the foregoing descriptions of step S602 and step S604. Details are not described herein again.

S809: In response to the activated serving cell changing, based on the new activated serving cell, the network device re-determines a reference cell in the frequency band and determines transmission directions of the reference cell and another cell in the frequency band. For details, refer to the foregoing descriptions of step S603 and step S605. Details are not described herein again.

The processor 401 in the terminal device 40 shown in FIG. 4 invokes the application program code stored in the memory 403 to instruct the terminal device to perform actions of the terminal device in steps S801 to S809. The processor 501 in the network device 50 shown in FIG. 4 invokes the application program code stored in the memory 502 to instruct the network device to perform actions of the network device in steps S801 to S809. This is not limited in this embodiment.

In the foregoing embodiments, the method and/or the step implemented by the terminal device is alternatively implemented by a component (for example, a chip or a circuit) that is used in the terminal device. The method and/or the step implemented by the network device is alternatively implemented by a component (for example, a chip or a circuit) that is used in the network device.

The foregoing mainly describes the solutions provided in at least one embodiment from a perspective of interaction between network elements. Correspondingly, an embodiment of this application further provides a communication apparatus, and the communication apparatus is configured to implement the foregoing methods. The communication apparatus is the terminal device in the foregoing method embodiment, an apparatus including the foregoing terminal device, or a component that is used in the terminal device. Alternatively, the communication apparatus is the network device in the foregoing method embodiment, an apparatus including the foregoing network device, or a component that is used in the network device. to implement the foregoing functions, the communication apparatus includes a hardware structure and/or a software module for performing a corresponding function. A person skilled in the art should be easily aware that units, algorithms, and steps in the examples described with reference to the embodiments disclosed in this specification is implemented in a form of hardware or a combination of hardware and computer software in at least one embodiment. Whether a function is performed by hardware or hardware driven by computer software depends on a particular application and a design constraint condition of the technical solutions. A person skilled in the art uses different methods to implement the described functions for each particular application, but the implementation is not considered to go beyond the scope of this application.

In at least one embodiment, division into functional modules is performed on the communication apparatus based on the foregoing method embodiments. For example, division into each functional module is performed based on each corresponding function, or two or more functions are integrated into one processing module. The integrated module is implemented in a form of hardware, or is implemented in a form of a software functional module. In at least one embodiment, division into the modules is an example and is merely logical function division, and is other division in an actual implementation.

Figure 9:
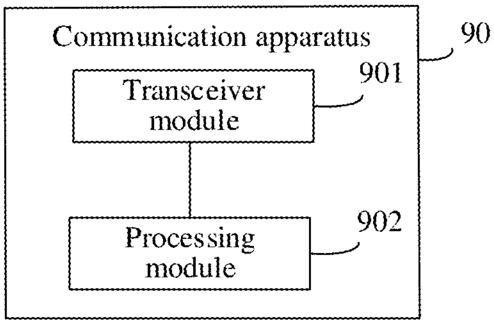
FIG. 9 is a schematic diagram of a structure of a communication apparatus according to at least one embodiment.

FIG. 9 is a schematic diagram of a structure of a communication apparatus 90. The communication apparatus 90 includes a transceiver module 901 and a processing module 902. The transceiver module 901 is also referred to as a transceiver unit, and is configured to implement a transceiver function, for example, is a transceiver circuit, a transceiver machine, a transceiver, or a communication interface.

An example in which the communication apparatus is the terminal device in the foregoing method embodiment is used. The transceiver module 901 is configured to receive first information from a network device, where the first information indicates a plurality of activated serving cells configured by the network device for the terminal device, and the plurality of activated serving cells are located in at least two different frequency bands. The processing module 902 is configured to determine, among the plurality of activated serving cells, a reference cell in each of the at least two frequency bands corresponding to the plurality of activated serving cells. The processing module 902 is further configured to determine a transmission direction of the terminal device in each of the plurality of activated serving cells, where in the frequency band, transmission directions of the terminal device in the reference cell and another cell are the same, and the another cell is an activated serving cell other than the reference cell in the frequency band.

Optionally, the transceiver module 901 is further configured to transmit second information to the network device, where the second information indicates that the terminal device supports simultaneous transmission and reception on carriers in different frequency bands.

Optionally, the transceiver module 901 is further configured to receive third information from the network device, where the third information indicates a plurality of serving cells configured by the network device for the terminal device, and the plurality of serving cells include the plurality of activated serving cells.

Optionally, the third information includes serving cell indexes of the plurality of serving cells.

Optionally, the first information includes a cell state of one or more of the plurality of serving cells, and the plurality of activated serving cells are serving cells having corresponding cell states among the plurality of serving cells.

Optionally, the first information includes indication information of serving cell indexes of the plurality of activated serving cells.

Optionally, the transceiver module 901 is further configured to receive fourth information from the network device, where the fourth information includes a deactivation timer of one or more of the plurality of activated serving cells. The processing module 902 is further configured to deactivate, based on the fourth information from the one or more of the plurality of activated serving cells, an activated serving cell in which no data is obtained through listening during running of the deactivation timer.

Optionally, the transceiver module 901 is further configured to receive fifth information from the network device, where the fifth information indicates a deactivated serving cell configured by the network device for the terminal device. The processing module 902 is further configured to deactivate, among the plurality of activated serving cells, the deactivated serving cell indicated by the fifth information.

Optionally, the fifth information includes indication information of a serving cell index of the deactivated serving cell.

Optionally, to determine, among the plurality of activated serving cells, a reference cell in each of the at least two frequency bands corresponding to the plurality of activated serving cells, the processing module 902 is further configured to: determine an activated serving cell having a smallest serving cell index in each of the at least two frequency bands corresponding to the plurality of activated serving cells as the reference cell in the frequency band.

All related content of the steps in the foregoing method embodiments is cited in function descriptions of corresponding functional modules. Details are not described herein again.

In this embodiment, the communication apparatus 90 is presented in a form of dividing the functional modules in an integrated manner. The "module" herein is a specific ASIC, a circuit, a processor that executes one or more software or firmware programs, a memory, an integrated logic circuit, and/or another device that provides the foregoing functions.

In at least one embodiment, a person skilled in the art is able to figure out that the communication apparatus 90 is in a form of the terminal device 40 shown in FIG. 4.

For example, the processor 401 in the terminal device 40 shown in FIG. 4 invokes the computer-executable instructions stored in the memory 402, so that the terminal device 40 performs the carrier aggregation method in the foregoing method embodiment. Specifically, functions/implementation processes of the transceiver module 901 and the processing module 902 in FIG. 9 are implemented by the processor 401 in the terminal device 40 shown in FIG. 4 by invoking the computer-executable instructions stored in the memory 402. Alternatively, a function/implementation process of the processing module 902 in FIG. 9 is implemented by the processor 401 in the terminal device 40 shown in FIG. 4 by invoking the computer-executable instructions stored in the memory 402, and a function/implementation process of the transceiver module 901 in FIG. 9 is implemented by using the transceiver 403 in the terminal device 40 shown in FIG. 4.

Because the communication apparatus 90 provided in this embodiment performs the carrier aggregation method, for technical effects that is obtained by the communication apparatus, refer to the foregoing method embodiments. Details are not described herein again.

An example in which the communication apparatus is the network device in the foregoing method embodiment is used. The transceiver module 901 is configured to transmit first information to a terminal device, where the first information indicates a plurality of activated serving cells configured by the network device for the terminal device, and the plurality of activated serving cells are located in at least two different frequency bands. The processing module 902 is configured to determine, among the plurality of activated serving cells, a reference cell in each of the at least two frequency bands corresponding to the plurality of activated serving cells. The processing module 902 is further configured to determine a transmission direction of the network device in each of the plurality of activated serving cells, where in the frequency band, transmission directions of the network device in the reference cell and another cell are the same, and the another cell is an activated serving cell other than the reference cell in the frequency band.

Optionally, the transceiver module 901 is further configured to receive second information from the terminal device, where the second information indicates that the terminal device supports simultaneous transmission and reception on carriers in different frequency bands.

Optionally, the transceiver module 901 is further configured to transmit third information to the terminal device, where the third information indicates a plurality of serving cells configured by the network device for the terminal device, and the plurality of serving cells include the plurality of activated serving cells.

Optionally, the third information includes serving cell indexes of the plurality of serving cells.

Optionally, the first information includes a cell state of one or more of the plurality of serving cells, and the plurality of activated serving cells are serving cells having corresponding cell states among the plurality of serving cells.

Optionally, the first information includes indication information of serving cell indexes of the plurality of activated serving cells.

Optionally, the transceiver module 901 is further configured to transmit fourth information to the terminal device, where the fourth information includes a deactivation timer of one or more of the plurality of activated serving cells.

Optionally, the transceiver module 901 is further configured to transmit fifth information to the terminal device, where the fifth information indicates a deactivated serving cell configured by the network device for the terminal device.

Optionally, the fifth information includes indication information of a serving cell index of the deactivated serving cell.

Optionally, to determine, among the plurality of activated serving cells, a reference cell in each of the at least two frequency bands corresponding to the plurality of activated serving cells, the processing module 902 is further configured to: determine an activated serving cell having a smallest serving cell index in each of the at least two frequency bands corresponding to the plurality of activated serving cells as the reference cell in the frequency band.

All related content of the steps in the foregoing method embodiments is cited in function descriptions of corresponding functional modules. Details are not described herein again.

In at least one embodiment, the communication apparatus 90 is presented in a form of dividing the functional modules in an integrated manner. The "module" herein is a specific ASIC, a circuit, a processor that executes one or more software or firmware programs, a memory, an integrated logic circuit, and/or another device that provides the foregoing functions.

In at least one embodiment, a person skilled in the art is able to figure out that the communication apparatus 90 is in a form of the network device 50 shown in FIG. 4.

For example, the processor 501 in the network device 50 shown in FIG. 4 invokes the computer-executable instructions stored in the memory 502, so that the network device 50 performs the carrier aggregation method in the foregoing method embodiment. Specifically, functions/implementation processes of the transceiver module 901 and the processing module 902 in FIG. 9 is implemented by the processor 501 in the network device 50 shown in FIG. 4 by invoking the computer-executable instructions stored in the memory 502. Alternatively, a function/implementation process of the processing module 902 in FIG. 9 is implemented by the processor 501 in the network device 50 shown in FIG. 4 by invoking the computer-executable instructions stored in the memory 502, and a function/implementation process of the transceiver module 901 in FIG. 9 is implemented by using the transceiver 503 in the network device 50 shown in FIG. 4.

Because the communication apparatus 90 provided in this embodiment performs the carrier aggregation method, for technical effects that is obtained by the communication apparatus, refer to the foregoing method embodiments. Details are not described herein again.

One or more of the foregoing modules or units are implemented by software, hardware, or a combination thereof. In response to any one of the foregoing modules or units being implemented by software, the software exists in a form of a computer program instruction, and is stored in the memory. The processor is configured to execute the program instruction and implement the foregoing method procedure. The processor is built into an system on a chip (SoC) or ASIC, or is a standalone semiconductor chip. In addition to a core configured to execute software instructions to perform an operation or processing, the processor further includes a hardware accelerator, for example, a field programmable gate array (FPGA), a programmable logic device (PLD), or a logic circuit that implements a dedicated logic operation.

In response to the foregoing modules or units being implemented by hardware, the hardware is any one or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete device, and the hardware runs software or does not depend on software to perform the foregoing method procedure.

Optionally, at least one embodiment further provides a chip system, including at least one processor and an interface. The at least one processor is coupled to a memory through the interface. In response to the at least one processor executing a computer program or instructions in the memory, the method in any one of the foregoing method embodiments is performed. In at least one embodiment, the communication apparatus further includes the memory. Optionally, the chip system includes a chip, or includes a chip and another discrete device. This is not specifically limited in at least one embodiment.

All or some of the foregoing embodiments are implemented by using software, hardware, firmware, or any combination thereof. In response to a software program being used to implement at least one embodiment, all or some of the embodiments are implemented in a form of a computer program product. The computer program product includes one or more computer instructions. In response to the computer program instructions being loaded and executed on a computer, the procedures or functions according to at least one embodiment are all or partially generated. The computer is a general-purpose computer, a dedicated computer, a computer network, or another programmable apparatus. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (DSL)) or wireless (for example, Infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk drive, or a magnetic tape), an optical medium (for example, a DVD), a semiconductor medium (for example, a solid state disk (SSD)), or the like.

Although embodiments herein are described with reference to at least one embodiment, in a process of implementing at least embodiment that claims protection, a person skilled in the art understands and implements another variation of the disclosed embodiments by viewing the accompanying drawings, disclosed content, and appended claims.

In the claims, "comprising" does not exclude another component or another step, and "a" or "one" does not exclude a case of multiple. A single processor or another unit implements several functions enumerated in the claims. Some measures are recorded in dependent claims that are different from each other, but this does not mean that the measures cannot be combined to produce a good effect.

Although embodiments are described with reference to specific features, various modifications and combinations are made to them without departing from the spirit and scope of this embodiments described herein. Correspondingly, embodiments described herein and the accompanying drawings are merely example descriptions defined by the appended claims, and are considered to have covered any of or all modifications, variations, combinations or equivalents within the scope of embodiments described herein. A person skilled in the art is able to make various modifications and variations to embodiments described herein without departing from the spirit and scope of the embodiments described herein. Therefore, embodiments described herein are intended to cover these modifications and variations that fall within the scope of the claims and equivalent technologies thereof.

What is claimed is:

1. A method, wherein the method comprises:
receiving first information from a network device, wherein the first information indicates a plurality of activated serving cells configured by the network device for a terminal device, and the plurality of activated serving cells are located in at least two different frequency bands;
determining, among the plurality of activated serving cells, a reference cell in each of the at least two different frequency bands;
determining a transmission direction of the terminal device in each of the plurality of activated serving cells, wherein in each of the at least two different frequency bands, transmission directions of the terminal device in the reference cell and another cell are the same, and the another cell is an activated serving cell other than the reference cell in the frequency band; and
performing simultaneous transmission and reception on carriers in different ones of the at least two different frequency bands.

2. The method according to claim 1, wherein the method further comprises:
transmitting second information to the network device, wherein the second information indicates that the terminal device supports the simultaneous transmission and reception on the carriers in different frequency bands.

3. The method according to claim 1, wherein the method further comprises:
receiving third information from the network device, wherein the third information indicates a plurality of serving cells configured by the network device for the terminal device, and the plurality of serving cells include the plurality of activated serving cells.

4. The method according to claim 1, wherein the method further comprises:
receiving fourth information from the network device, wherein the fourth information includes a deactivation timer of one or more of the plurality of activated serving cells; and
deactivating, based on the fourth information from the one or more of the plurality of activated serving cells, an activated serving cell in which no data is obtained through listening during running of the deactivation timer.

5. The method according to claim 1, wherein the method further comprises:
receiving fifth information from the network device, wherein the fifth information indicates a to-be-deactivated serving cell configured by the network device for the terminal device; and
deactivating, among the plurality of activated serving cells, the to-be-deactivated serving cell indicated by the fifth information.

6. The method according to claim 1, wherein the determining, among the plurality of activated serving cells, the reference cell in each of the at least two different frequency bands includes:
determining an activated serving cell having a smallest serving cell index in each of the at least two different frequency bands as the reference cell in the frequency band.

7. A method, wherein the method comprises:
transmitting first information to a terminal device, wherein the first information indicates a plurality of activated serving cells configured by a network device for the terminal device, and the plurality of activated serving cells are located in at least two different frequency bands;
determining, among the plurality of activated serving cells, a reference cell in each of the at least two different frequency bands;
determining a transmission direction of the network device in each of the plurality of activated serving cells, wherein in each of the at least two different frequency bands, transmission directions of the network device in the reference cell and another cell are the same, and the another cell is an activated serving cell other than the reference cell in the frequency band; and
performing simultaneous transmission and reception on carriers in different ones of the at least two different frequency bands.

8. The method according to claim 7, wherein the method further comprises:
receiving second information from the terminal device, wherein the second information indicates that the terminal device supports the simultaneous transmission and reception on the carriers in different frequency bands.

9. The method according to claim 7, wherein the method further comprises:
transmitting third information to the terminal device, wherein the third information indicates a plurality of serving cells configured by the network device for the terminal device, and the plurality of serving cells includes the plurality of activated serving cells.

10. The method according to claim 7, wherein the determining, among the plurality of activated serving cells, the reference cell in each of the at least two different frequency bands corresponding to the plurality of activated serving cells includes:
determining an activated serving cell having a smallest serving cell index in each of the at least two different frequency bands corresponding to the plurality of activated serving cells as the reference cell in the frequency band.

11. An apparatus comprising:
a memory storing computer-executable instructions; and one or more processors connected to the memory, wherein the one or more processors are configured to execute the computer-executable instructions to perform operations to:

receive first information from a network device, wherein the first information indicates a plurality of activated serving cells configured by the network device for a terminal device, and the plurality of activated serving cells are located in at least two different frequency bands;

determine, among the plurality of activated serving cells, a reference cell in each of the at least two different frequency bands;

determine a transmission direction of the terminal device in each of the plurality of activated serving cells, wherein in each of the at least two different frequency bands, transmission directions of the terminal device in the reference cell and another cell are the same, and the another cell is an activated serving cell other than the reference cell in the frequency band; and perform simultaneous transmission and reception on carriers in different ones of the at least two different frequency bands.

12. The apparatus according to claim 11, wherein the one or more processors are further configured to:

transmit second information to the network device, wherein the second information indicates that the terminal device supports the simultaneous transmission and reception on the carriers in different frequency bands.

13. The apparatus according to claim 11, wherein the one or more processors are further configured to:

receive third information from the network device, wherein the third information indicates a plurality of serving cells configured by the network device for the terminal device, and the plurality of serving cells include the plurality of activated serving cells.

14. The apparatus according to claim 11, wherein the one or more processors are further configured to:

receive fourth information from the network device, wherein the fourth information includes a deactivation timer of one or more of the plurality of activated serving cells; and deactivate, based on the fourth information from the one or more of the plurality of activated serving cells, an activated serving cell in which no data is obtained through listening during running of the deactivation timer.

15. The apparatus according to claim 11, wherein the one or more processors are further configured to:

receive fifth information from the network device, wherein the fifth information indicates a to-be-deactivated serving cell configured by the network device for the terminal device; and deactivate, among the plurality of activated serving cells, the to-be-deactivated serving cell indicated by the fifth information.

16. The apparatus according to claim 11, wherein the one or more processors are further configured to determine, among the plurality of activated serving cells, the reference cell in each of the at least two different frequency bands by:

determining an activated serving cell having a smallest serving cell index in each of the at least two different frequency bands as the reference cell in the frequency band.

17. An apparatus comprising:

a memory storing computer-executable instructions; and one or more processors connected to the memory, wherein the one or more processors are configured to execute the computer-executable instructions to perform operations to:

transmit first information to a terminal device, wherein the first information indicates a plurality of activated serving cells configured by a network device for the terminal device, and the plurality of activated serving cells are located in at least two different frequency bands;

determine, among the plurality of activated serving cells, a reference cell in each of the at least two different frequency bands;

determine a transmission direction of the network device in each of the plurality of activated serving cells, wherein in each of the at least two different frequency bands, transmission directions of the network device in the reference cell and another cell are the same, and the another cell is an activated serving cell other than the reference cell in the frequency band; and perform simultaneous transmission and reception on carriers in different ones of the at least two different frequency bands.

18. The apparatus according to claim 17, wherein the one or more processors are further configured to:

receive second information from the terminal device, wherein the second information indicates that the terminal device supports the simultaneous transmission and reception on the carriers in different frequency bands.

19. The apparatus according to claim 17, wherein the one or more processors are further configured to:

transmit third information to the terminal device, wherein the third information indicates a plurality of serving cells configured by the network device for the terminal device, and the plurality of serving cells include the plurality of activated serving cells.

20. The apparatus according to claim 17, wherein the one or more processors are further configured to determine, among the plurality of activated serving cells, the reference cell in each of the at least two different frequency bands corresponding to the plurality of activated serving cells by:

determining an activated serving cell having a smallest serving cell index in each of the at least two different frequency bands corresponding to the plurality of activated serving cells as the reference cell in the frequency band.

* * * * *